United States Patent
Gangoli et al.

(10) Patent No.: US 9,664,381 B2
(45) Date of Patent: May 30, 2017

(54) STAGED OXY-FUEL BURNERS AND METHODS FOR USING THE SAME

(71) Applicant: Air Products and Chemicals, Inc., Allentown, PA (US)

(72) Inventors: Shailesh Pradeep Gangoli, Easton, PA (US); Aleksandar Georgi Slavejkov, Allentown, PA (US); Michael David Buzinski, Slatington, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 974 days.

(21) Appl. No.: 13/690,709

(22) Filed: Nov. 30, 2012

(65) Prior Publication Data
US 2013/0143169 A1    Jun. 6, 2013

Related U.S. Application Data

(60) Provisional application No. 61/565,560, filed on Dec. 1, 2011.

(51) Int. Cl.
*F23D 14/58* (2006.01)
*F23D 14/22* (2006.01)
*F23D 14/32* (2006.01)

(52) U.S. Cl.
CPC ............ *F23D 14/58* (2013.01); *F23D 14/22* (2013.01); *F23D 14/32* (2013.01); *F23D 14/583* (2013.01); *Y02E 20/344* (2013.01)

(58) Field of Classification Search
USPC .......................................................... 431/8
See application file for complete search history.

(56) References Cited

U.S. PATENT DOCUMENTS

| 1,947,201 A | * | 2/1934 | Hacker | ................... F23D 14/22 239/549 |
| 3,387,784 A | * | 6/1968 | Ward, Jr. | ................. C21O 5/04 239/132.3 |
| 3,758,037 A | | 9/1973 | Marion et al. | |

(Continued)

FOREIGN PATENT DOCUMENTS

DE    9403330 U1    4/1994
EP    1335163 A1    8/2003
(Continued)

OTHER PUBLICATIONS

Charles E. Baukal, Jr., Industrial Burners Handbook, Figure 21.4 of Section 1.4.1, CRC Press 2004, p. 703.

*Primary Examiner* — Gregory Huson
*Assistant Examiner* — Martha Becton
(74) *Attorney, Agent, or Firm* — Larry S. Zelson

(57) ABSTRACT

A burner including a central oxidant nozzle defining a central axis of the burner, and a plurality of flame holders each having an axis spaced apart from the axis of the burner, each flame holder including a high shape factor nozzle including a nozzle opening having a shape factor from about 10 to about 75, the shape factor being defined as the square of the nozzle perimeter divided by twice the nozzle cross-sectional area, and an annular nozzle surrounding the high shape factor nozzle, wherein the high shape factor nozzle is configured to be supplied with one of a fuel gas and an oxidizer gas, and the annular nozzle is configured to be supplied with the other of a fuel gas and an oxidizer gas.

32 Claims, 20 Drawing Sheets

(56) References Cited

U.S. PATENT DOCUMENTS

| | | | |
|---|---|---|---|
| 5,545,031 A * | 8/1996 | Joshi | F23D 14/22 239/424 |
| 5,575,637 A * | 11/1996 | Slavejkov | C03B 5/2353 431/10 |
| 5,803,725 A * | 9/1998 | Horn | F23D 14/22 239/416.4 |
| 5,839,890 A * | 11/1998 | Snyder | F23D 14/48 239/553 |
| 5,871,343 A * | 2/1999 | Baukal, Jr. | F23D 14/32 239/422 |
| 6,866,503 B2 | 3/2005 | Ladharam | |
| 6,926,516 B1 * | 8/2005 | Sudo | F23D 14/22 239/433 |
| 2001/0023053 A1 * | 9/2001 | Hoke, Jr. | F23D 14/32 431/8 |
| 2003/0148236 A1 | 8/2003 | Joshi et al. | |
| 2007/0048679 A1 | 3/2007 | Joshi et al. | |
| 2007/0254251 A1 | 11/2007 | Cao et al. | |
| 2008/0096146 A1 * | 4/2008 | Li | F23C 6/045 431/9 |
| 2009/0111064 A1 * | 4/2009 | Li | F23C 6/047 431/10 |

FOREIGN PATENT DOCUMENTS

| | | | |
|---|---|---|---|
| EP | 1443271 | A1 | 8/2004 |
| EP | 1531303 | A1 | 5/2005 |
| EP | 1612481 | A2 | 1/2006 |
| EP | 1850067 | A2 | 10/2007 |

* cited by examiner

Fig. 4B
Fig. 4A

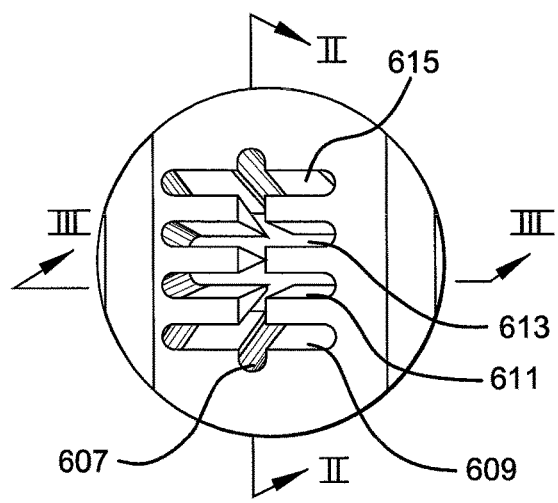
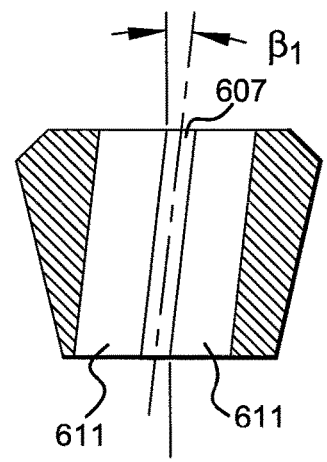
FIG. 10A
FIG. 10C
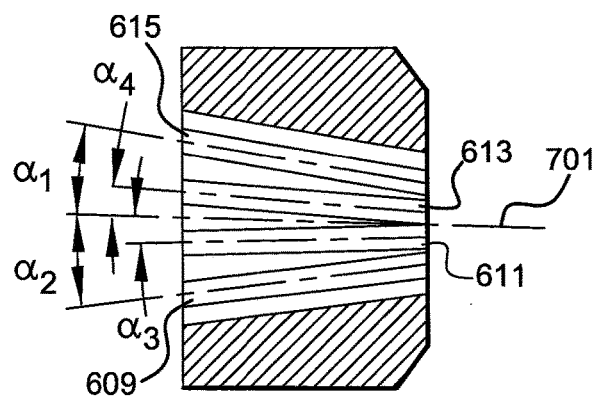
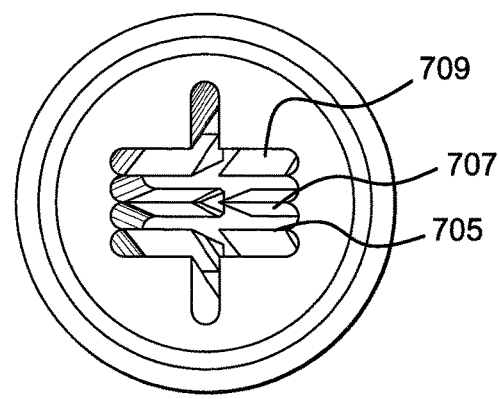
FIG. 10B
FIG. 10D

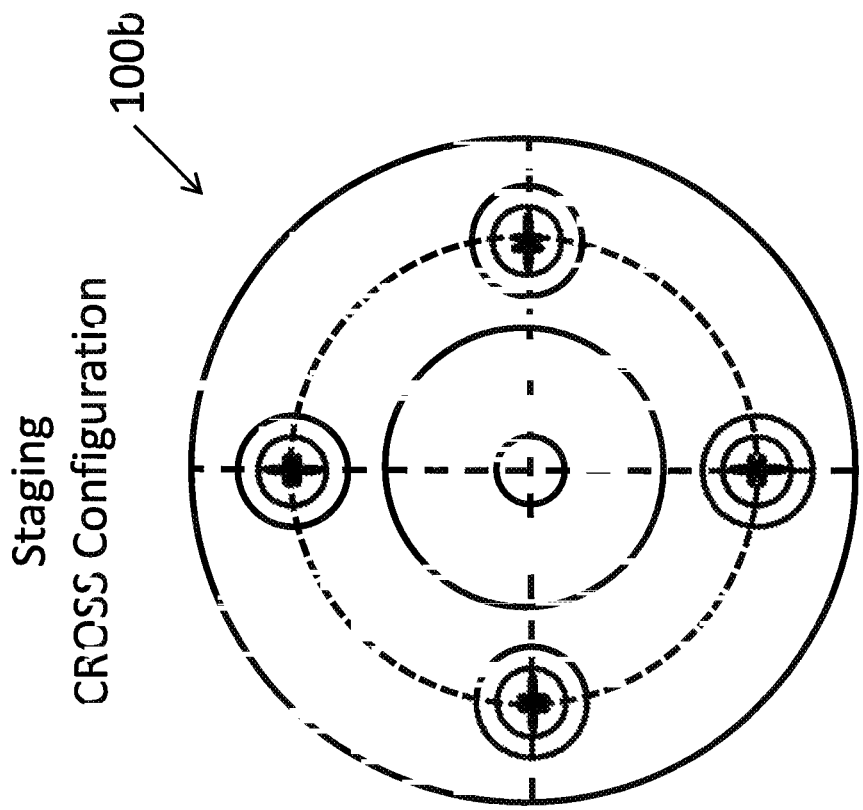
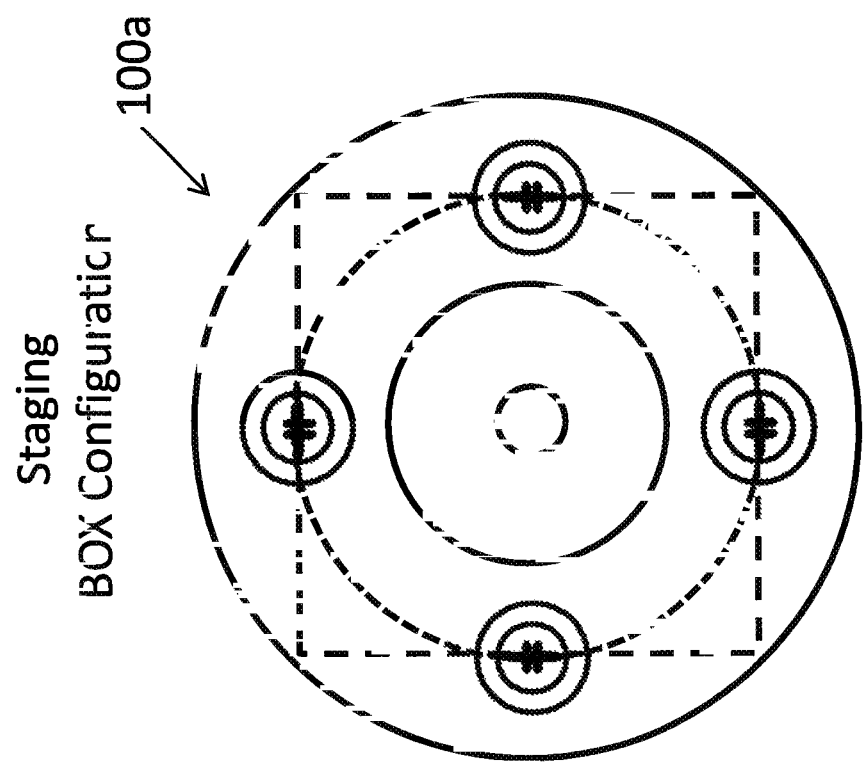

STAGED OXY-FUEL BURNERS AND METHODS FOR USING THE SAME

CROSS-REFERENCE TO RELATED APPLICATIONS

This application claims the priority of U.S. Provisional Patent Application No. 61/565,560 filed on Dec. 1, 2011, which is incorporated by reference herein in its entirety. This application is related to application Ser. No. 13/690,492, entitled "RAPID ENERGY RELEASE BURNERS AND METHODS FOR USING THE SAME", filed contemporaneously with this application on Nov. 30, 2012, and assigned to the assignee of the present disclosure.

BACKGROUND OF THE INVENTION

The subject matter of this invention relates to a staged oxy-fuel burner that may be used as an oxy-fuel burner or an air-oxy-fuel burner to enable a spacious mode of combustion, low NOx, and a controlled heat flux profile.

Oxy-fuel and air-oxy-fuel burners are used in a wide range of applications. In some applications, it is desirable to have a burner with a rapid heat flux combined with low NOx, operating in an oxy-fuel or air-oxy-fuel mode. In other applications it is desirable to have a burner with uniform heat flux combined with low NOx. In yet other applications it is desirable to have a heat flux profile that can be adjusted to accommodate a particular furnace or heating scenario.

Conventional oxy-fuel burners and methods for using burners for entraining furnace gas into the combustion zone are described in U.S. Pat. No. 6,866,503 B2, U.S. Pub. No. 2003/0148236 A1, and US Pub. No. 2007/0254251 A1, which are hereby incorporated by reference in their entirety. High momentum nozzles in those burners can be susceptible to fouling and clogging, particularly when operated in dusty or dirty environments. Another conventional burner known as a "pipe-in-pipe" burner is disclosed in FIG. 21.4 of section 21.4.1 of the Industrial Burners Handbook, CRC Press 2004. There is a need in this art for a burner and method that provides spacious combustion, reduced NOx, and a controllable heat flux profile.

BRIEF SUMMARY OF THE INVENTION

A staged oxy-fuel burner as described herein provides a spacious mode of combustion that is believed to induce enhanced convective heat transfer from the flame. The burner utilizes a central oxidant staging nozzle surrounded by high shape factor nozzles, each high shape factor nozzle being shielded by an annular jet to inhibit fouling and clogging of the high shape factor nozzles. Burners as described herein can be operated in oxy-fuel, air-oxy-fuel, and air-fuel regimes, and can utilize one or more fuels. Flames produced by the burners can be controlled to have nearly uniform heat flux and to produce lower NOx than comparable oxy-fuel and air-oxy-fuel burners.

In one embodiment, a burner is described having a central oxidant nozzle defining a central axis of the burner and a plurality of flame holders each having an axis spaced apart from the axis of the burner. Each flame holder includes a high shape factor nozzle including a nozzle opening having a shape factor from about 10 to about 75, the shape factor being defined as the square of the nozzle perimeter divided by twice the nozzle cross-sectional area, and an annular nozzle surrounding the high shape factor nozzle. The high shape factor nozzle is configured to be supplied with one of a fuel gas and an oxidizer gas, and the annular nozzle is configured to be supplied with the other of a fuel gas and an oxidizer gas.

In one aspect, the central oxidant nozzle includes a central staging nozzle and an annular nozzle surrounding the central staging nozzle and positioned radially inward from the flame holders.

In one another aspect, high shape factor nozzle opening includes a major axis of the nozzle opening. In a variation, the high shape factor nozzle opening includes a central slot defining the major axis and one or more cross-slots intersecting the central slot. At least one flame holder may be oriented so that the major axis of the high shape factor nozzle opening intersects the central axis of the burner, or each flame holder may be oriented so that the major axis of the high shape factor nozzle opening intersects the central axis of the burner. At least one flame holder may be oriented so that the major axis of the high shape factor nozzle opening is perpendicular to a radius extending outward from the central axis of the burner, or each flame holder may be oriented so that the major axis of the high shape factor nozzle opening is perpendicular to a radius extending outward from the central axis of the burner.

In another aspect, a plane extending generally axially outward from the major axis of the high shape factor nozzle opening of each the flame holder is substantially parallel to the central burner axis. Alternatively, in another aspect, a plane extending generally axially outward from the major axis of the high shape factor nozzle opening is angled radially with respect to the central burner axis at an angle of about 30° radially inward to about 30° radially outward. Alternatively, in another aspect, a plane extending generally axially outward from the major axis of the high shape factor nozzle opening of each flame holder is angled radially inward toward the central burner axis at an angle of less than or equal to about 10°.

In another aspect, the high shape factor nozzle has a body tapers narrower toward the nozzle opening, the nozzle body having two tapered faces that at an angle of about 15° to about 30° with respect to the major axis of the high shape factor nozzle opening, and the high shape factor nozzle has a cross-sectional area and an outlet face with an area from about 35% to about 70% of the cross-sectional area.

In another aspect, the high shape factor nozzle is configured to be supplied with fuel gas and the annular nozzle is configured to be supplied with oxidizer gas. Alternative, in another aspect, the high shape factor nozzle is configured to be supplied with oxidizer gas and the annular nozzle is configured to be supplied with fuel gas.

In another aspect, the flame holders are approximately equally spaced apart with respect to each other.

In another aspect, the annular nozzle has a discharge end, and the nozzle opening of the high shape factor nozzle is axially recessed from the discharge end by less than or equal to about one high shape factor nozzle diameter.

In another aspect, an annular nozzle opening is formed between the annular nozzle and the high shape factor nozzle, and the high shape factor nozzle opening and the annular nozzle opening are sized so as to provide a velocity ratio of a gas stream flowing through the annular nozzle to a gas stream flowing through the high shape factor nozzle opening, $V_{ANNULAR}/V_{HSF}$, of less than about 1.

In another embodiment, a method of combustion is described. The method includes supplying one or both of air and oxidizer gas to a central oxidant nozzle defining a central axis of a burner, supplying fuel gas and oxidizer gas to a plurality of flame holders each having an axis spaced apart from a central axis of the burner, each flame holder having a high shape factor nozzle and an annular nozzle surrounding the high shape factor nozzle, flowing one of the fuel gas and the oxidizer gas through the high shape factor nozzle, and flowing the other of the fuel gas and the oxidizer gas through the annular nozzle. The high shape factor nozzle includes nozzle opening having a shape factor from about 10 to about 75, the shape factor being defined as the square of the nozzle perimeter divided by twice the nozzle cross-sectional area.

In one aspect, fuel gas is flowed through the high shape factor nozzle and oxidizer gas is flowed through the annular nozzle. Alternatively, in another aspect, oxidizer gas is flowed through the high shape factor nozzle and fuel gas is flowed through the annular nozzle.

In another aspect, the central oxidant nozzle includes a central staging nozzle and an annular nozzle surrounding the central staging nozzle and positioned radially inward from the flame holders, and the method further includes flowing oxidizer gas through the central staging nozzle and flowing air through the annular nozzle. Alternatively, in another aspect, the method further includes flowing oxidizer gas through the central oxidant nozzle. Alternatively, in another aspect, the method further includes flowing air through the central oxidant nozzle.

In another aspect, the method includes flowing sufficient flow of the oxidizer gas to the central oxidant nozzle to provide about 75% of the stoichiometric oxygen requirement for the fuel gas, and flowing sufficient flow of the oxidizer gas to the flame holders to provide the balance of the stoichiometric oxygen requirement for the fuel gas.

In another aspect, the method includes flowing sufficient flow of the oxidizer gas to the central oxidant nozzle to provide from about 50% to about 90% of the stoichiometric oxygen requirement for the fuel gas, and flowing sufficient flow of the oxidizer gas to the flame holders to provide the balance of the stoichiometric oxygen requirement for the fuel gas.

In another aspect, the method includes flowing sufficient flow of the oxidizer gas to the flame holders to provide essentially 100% of the stoichiometric oxygen requirement for the fuel gas, and flowing essentially 0% of the stoichiometric requirement of oxidizer gas to the central oxidant nozzle.

In another aspect, the method includes flowing sufficient flow of the oxidizer gas to the flame holders to provide no more than about 5% of the stoichiometric oxygen requirement for the fuel gas, and flowing sufficient flow of the oxidizer gas to the central oxidant nozzle to provide the balance of the stoichiometric oxygen requirement for the fuel gas.

In another aspect, the method includes flowing sufficient flow of the oxidizer gas to the central oxidant nozzle to provide essentially 100% of the stoichiometric oxygen requirement for the fuel gas, and flowing essentially 0% of the stoichiometric requirement of oxidizer gas to the flame holders.

In another aspect, the high shape factor nozzle opening of each flame holder includes a major axis and a plane extending generally axially outward from the major axis of the central slot of each flame holder flame holder axis is angled radially inward toward the central burner axis at an angle of less than or equal to about 10°.

In another aspect, the flame holders are approximately equally spaced apart with respect to each other.

In another aspect, the high shape factor nozzle opening includes a major axis of the nozzle opening, and each flame holder is oriented so that the major axis of the high shape factor nozzle opening intersects the central axis of the burner.

In another aspect, the high shape factor nozzle opening includes a major axis of the nozzle opening, and each flame holder is oriented so that the major axis of the high shape factor nozzle opening is perpendicular to a radius extending outward from the central axis of the burner.

In another aspect, an annular nozzle opening is formed between the annular nozzle and the high shape factor nozzle, and the method further includes causing the ratio of the velocity of the gas flowing through the annular nozzle opening to the velocity of the gas flowing through the high shape factor nozzle opening, $V_{ANNULAR}/V_{HSF}$, to be less than about 1.

The various aspects of the invention disclosed herein can be used alone or in combinations with each other.

BRIEF DESCRIPTION OF SEVERAL VIEWS OF THE DRAWINGS

FIGS. 4A and 4B are photographs comparing a flame from a conventional burner (FIG. 4A) to a flame formed by a burner including a high shape factor nozzle surrounded by an annular nozzle as described herein (FIG. 4B).

FIG. 10A is a front view of the nozzle body of FIG. 8 showing the discharge end or nozzle of the nozzle body.

FIG. 10B is a cross-sectional view of section II-II of FIG. 10A.

FIG. 10C is a cross-sectional view of section III-III of FIG. 10A.

FIG. 10D is a rear view of the nozzle body of FIG. 8 showing the inlet end of the nozzle body.

FIGS. 17A and 17B are end views comparing embodiments of a staged oxy-fuel burner with an oxidant nozzle including a central oxygen staging nozzle surrounded by an annular air nozzle, and having high shape factor flame holders oriented in a box configuration (with a major axis of the high shape factor nozzle opening intersecting a central axis of the burner) and a cross configuration (with a major axis of the high shape factor nozzle opening perpendicular to a radius extending from a central axis of the burner).

DETAILED DESCRIPTION OF THE INVENTION

Figure 1:
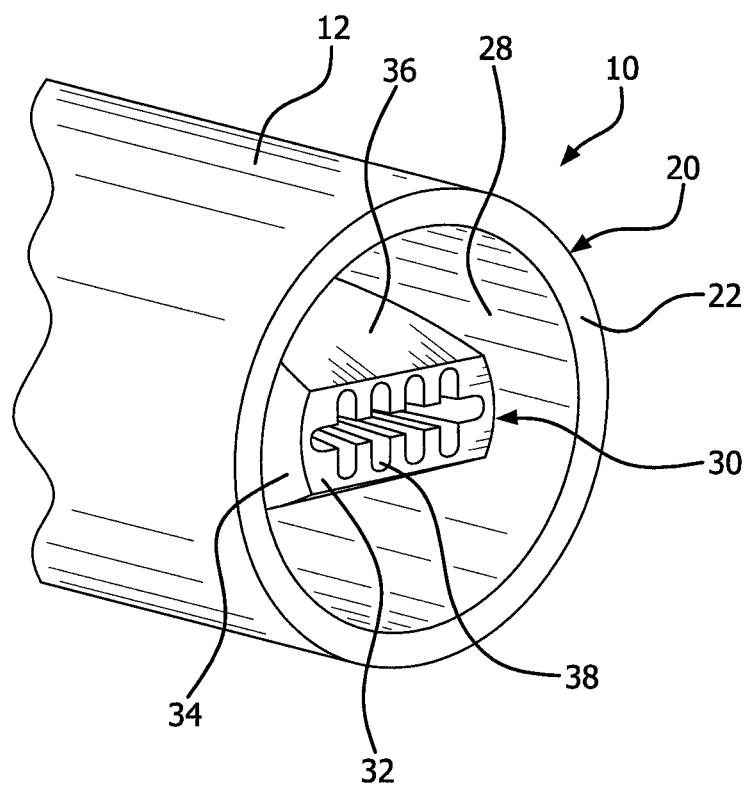
FIG. 1 is a perspective view of a rapid energy release burner including a high shape factor nozzle surrounded by an annular nozzle.

A staged oxy-fuel burner is described that can provide controllable heat flux profile and reduced NOx.

As used herein, the terms "oxidizer" and "oxidant" are used interchangeably to mean a gas having a greater $O_2$ concentration than air, for example at least about 23 vol. % $O_2$, or at least about 30 vol. % $O_2$, or at least about 60 vol. % $O_2$, or at least about 85 vol. % $O_2$, or about 100% $O_2$. As used herein, "fuel gas" can include any gaseous fuel capable of combusting in an oxidizer or oxidant, including but not limited to natural gas. As used herein, "air" means a gas having approximately 20.8 vol. % $O_2$.

FIGS. 1-3B show an exemplary burner 10 having an outer conduit 12 and an inner conduit 14. The outer conduit 12 terminates in an annular nozzle 20 having a discharge end 22, and the inner conduit 14 terminates in a high shape factor (HSF) nozzle 30. The HSF nozzle 30 includes an outlet face 32 and a nozzle body 34 connected to the inner conduit 14. A nozzle opening 38 is formed in the outlet face 32 of the nozzle 30. An annular nozzle opening 28 is formed between the annular nozzle 20 and the HSF nozzle 30.

An optional igniter 40, as shown in the figures, may be provided for ignition of the burner 10. Spacers 42 may be provided to position the HSF nozzle 30 within the annular nozzle 20. Additionally, a cooling passage 44 may be provided in the outer nozzle 12 to enable flow of a liquid coolant to remove heat from the annular nozzle 20.

During operation of the burner 10, the HSF nozzle 30 is supplied with an inner stream of either fuel gas or oxidizer gas by the inner conduit 14, and the annular nozzle 20 is supplied with an outer stream of either fuel gas or oxidizer gas by the outer conduit 12. One of fuel gas and oxidizing gas is supplied to the HSF nozzle 30, and the other of fuel gas and oxidizing gas is supplied to the annular nozzle 20. Upon exit from the HSF nozzle 30, the inner stream forms an inner jet of gas that entrains the outer stream of gas. In one embodiment, fuel gas is supplied as the inner stream to the HSF nozzle 30 while oxidizer gas is supplied as the outer stream to the annular nozzle 20. In another embodiment, oxidizer gas is supplied as the inner stream to the HSF nozzle 30 while fuel gas is supplied as the outer stream to the annular nozzle 20.

As shown in FIGS. 1-3B, the annular nozzle 20 completely surrounds the high shape factor nozzle 30. In one embodiment, the high shape factor nozzle 30 is centrally disposed within the annular nozzle 20 so that the annular nozzle opening 28 is symmetric about the high shape factor nozzle 30. In another embodiment, a plurality of high shape factor nozzles 30 are positioned within the annular nozzle and surrounded by the annular nozzle opening 28.

The high shape factor nozzle discharge opening 38 has a geometry that helps the exiting inner stream produce a large degree of fluid entrainment of the outer stream. In the depicted embodiment, the nozzle 30 can be described as "slotted" or "zippered" in shape. The nozzle opening 38 is characterized by a shape factor, σ, that is at least about 10, wherein σ is a dimensionless parameter defined as $$\sigma = P^2/2A$$

where P is the perimeter of the discharge opening and A is the flow area of the discharge opening. The perimeter dimension is the dimension of the wetted edges of the discharge opening as measured at the plane of the nozzle face where the nozzle discharges into the combustion zone.

The shape factor determines the extent of interaction between the inner jet and the outer surrounding stream. Various geometries may be used to achieve the desired shape factor, σ, including those shown herein and in U.S. Pat. No. 6,866,503, incorporated herein by reference. As one example, the nozzle 30 shown in the embodiment of FIGS. 1-3, with one central slot and four cross slots, has a shape factor of 41.6. A similar nozzle with one central slot and three cross slots has a shape factor of about 32.9. By comparison, the shape factor of a conventional circular nozzle is about 6.28 (i.e., 2π). The shape factor for HSF nozzles 30 in a rapid energy release burner 10 as described herein can range from at least about 10 to as large as about 75, and is preferably greater than or equal to about 10, more preferably greater than or equal to about 25, and most preferably greater than or equal to about 35. Thus, the shape factor for the HSF nozzles can be from about 1.5 to about 12 times that of a conventional circular nozzle, and in the exemplary embodiments depicted in FIG. 1-3, the nozzle shape factor is about 6.6 times that of a conventional circular nozzle. Such shape factors have been shown in simulations and testing to be able to obtain a rapid release heat flux profile, as discussed below in further detail with respect to FIGS. 5A and 5B.

The high shape factor nozzle 30 creates low pressure areas or pockets around the perimeter of the nozzle opening 38, and in particular between the slots, which helps to entrain surrounding gases. The inner stream jet (for example, fuel gas) exiting the high shape factor nozzle opening 38 acts to entrain the outer stream (for example, oxidizer gas) exiting the annular nozzle opening 28. The shape of the nozzle opening 38 causes the inner stream jet to create turbulence, thereby rapidly mixing the inner and outer streams, and resulting in a bushy high energy release flame. Without wishing to be bound by any theory or explanation, in general the higher the shape factor, the faster the mixing between fuel and oxidizer streams and hence more voluminous the flame is likely to be.

Rapid release of energy can be achieved by enhanced mixing of fuel and oxidizer flows. Several factors, in combination with the use of high shape factor nozzles, can be employed to achieve a rapid heat flux profile. In one aspect, the HSF nozzle 30 can be completely surrounded by the annular nozzle 20. This maximizes the interaction between the fuel gas and oxidizer gas streams to promote rapid mixing.

In another aspect, the HSF nozzle 30 can have a tapered shape, as shown in FIG. 3 with the nozzle body 34 of the nozzle 30 having tapered faces 36 that angle inwardly toward the outlet face 32. The angle of taper, $\phi$, can be from about 15° to about 45°, preferably from about 15° to about 30°, and more preferably about 20°. The tapered faces 36 reduce overheating of the nozzle 30 by minimizing recirculation of the outer stream at the outlet face 32. The tapered faces 36 also help streamline the outer stream flowing from the annular nozzle opening 28 into the inner stream or jet exiting the HSF nozzle opening 38. In one aspect, the HSF nozzle 30 has a center plane defined by the nozzle opening 38, and the tapered faces 36 are on opposite sides of the nozzle body 34 and taper inward toward the center plane, such that projections of the opposed faces and the center plane would intersect at a line in the combustion zone beyond the outlet face 32 of the nozzle 30.

Figure 2:
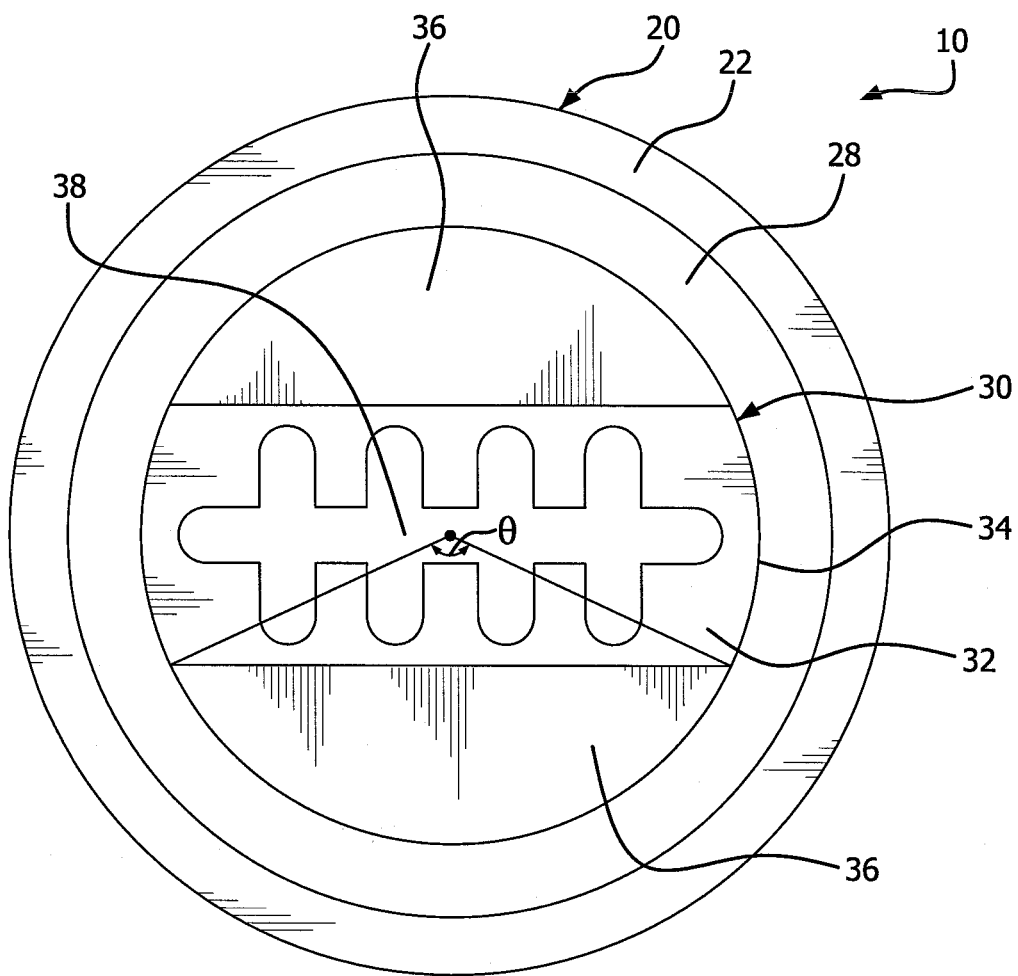
FIG. 2 is an end view of a burner as in FIG. 1.
Figure 3A:
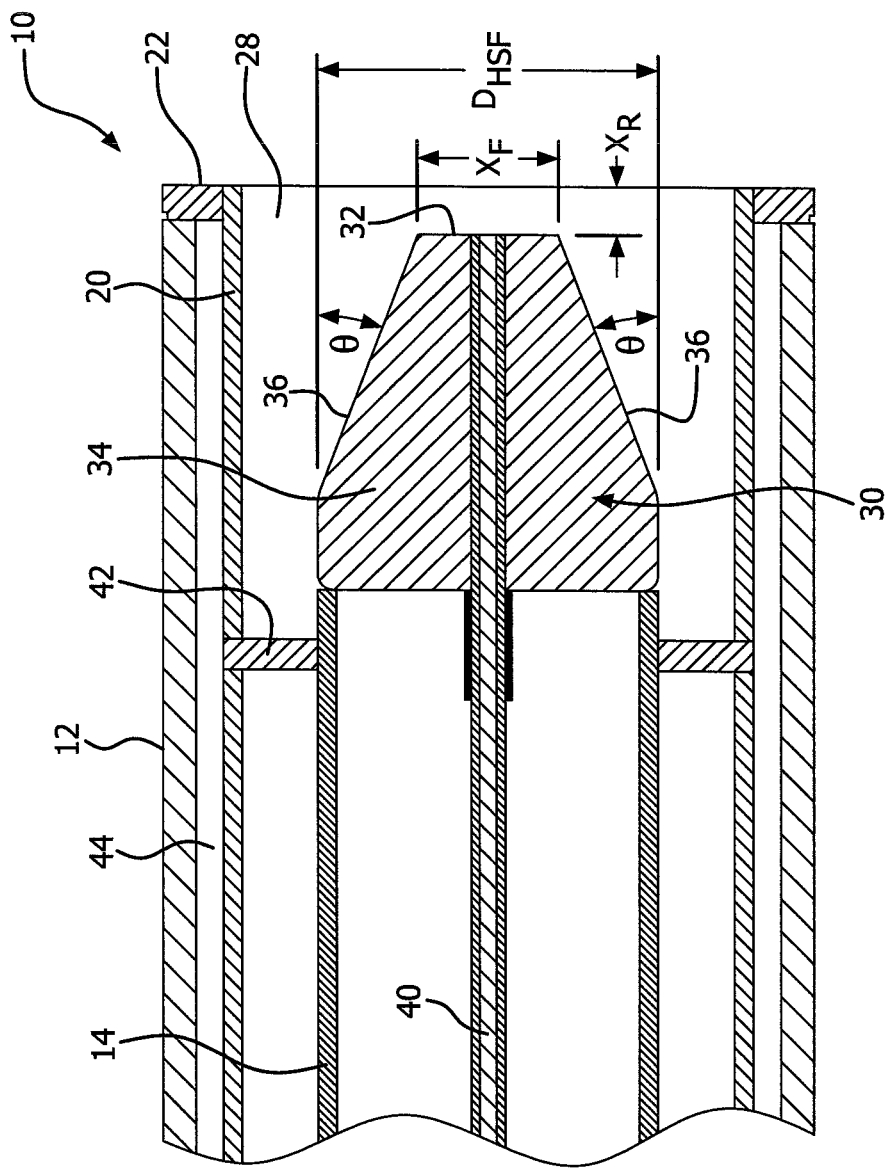
FIG. 3A is a cross-sectional view of a burner as in FIG. 1, taken a vertical section as the nozzle appears in FIG. 2.
Figure 3B:
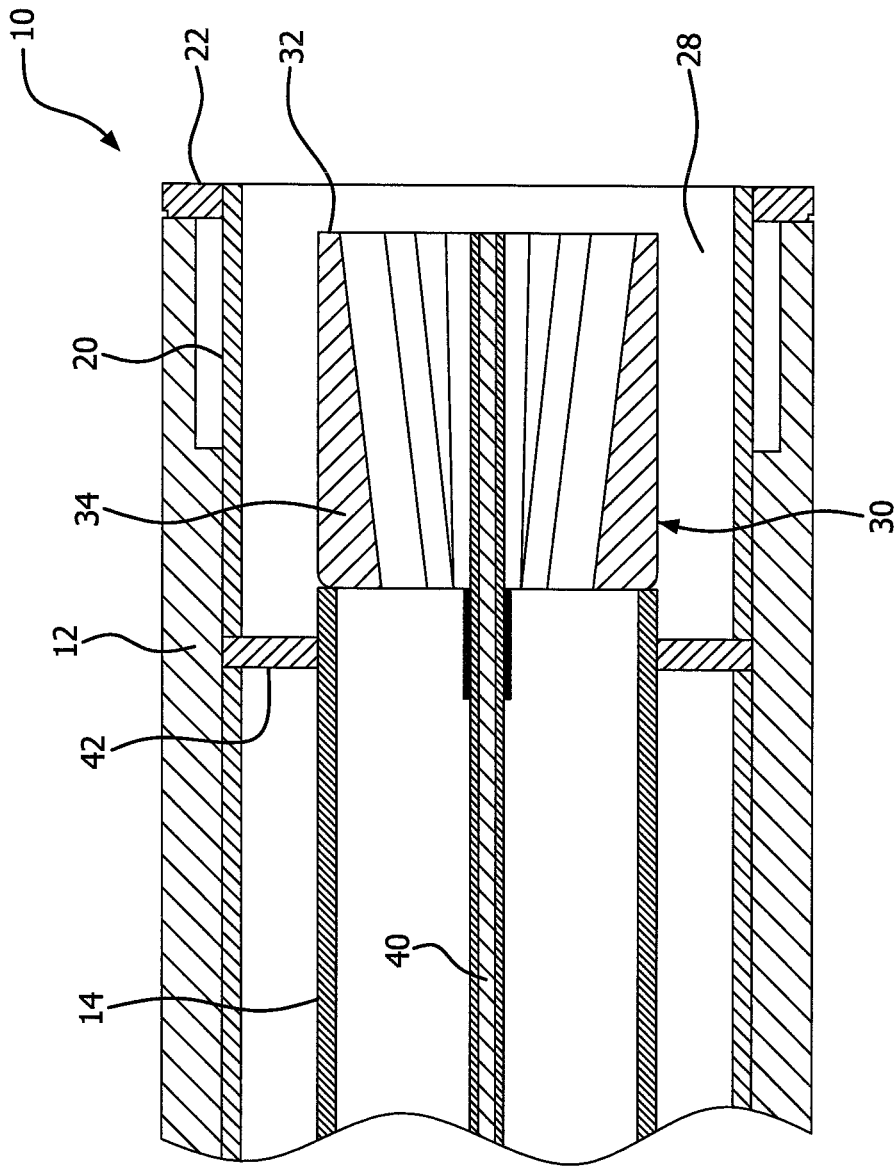
FIG. 3B is a cross-sectional view of a burner as in FIG. 1, taken a horizontal section as the nozzle appears in FIG. 2.

The tapered faces 36 can further be defined by the area ratio of the HSF nozzle outlet face 32 ($A_F$) to the cross-sectional area of the HSF nozzle 30 ($A_N$). As shown in FIGS. 2 and 3A, the HSF nozzle 30 has a diameter $D_{HSF}$ and the outer face 32 has a height $X_F$ that is less than the diameter $D_{HSF}$. From the end view of FIG. 2, it can be seen that the area difference between $A_N$ and $A_F$ is twice the projected area of the circle segments representing the tapered faces 36, each of those circle segments being defined as subsuming an angle $\theta$. Specifically, the HSF nozzle area $A_N$ can be calculated as:

$$A_N = \frac{\pi D_{HSF}^2}{4}$$

while the HSF nozzle outer face area $A_F$ can be calculated as:

$$A_F = \frac{D_{HSF}^2}{4}(\pi - \theta - \sin\theta)$$

where $\theta = 2 \cdot \arccos(X_F/D_{HSF})$. The area ratio $A_F/A_N$ can be from about 35% to about 70%, which corresponds approximately to an $X_F/D_{HSF}$ range of about 28% to about 59% and a subsumed angle $\theta$ range of about 108° to about 147°. In the embodiment depicted in FIGS. 1-3B, the subsumed angle $\theta$ is about 132° and the ratio $X_F/D_{HSF}$ is about 41%, resulting in an area ratio $A_F/A_N$ of about 51%.

The tapered shape of the HSF nozzle 30 helps to significantly reduce the surface temperature of the outlet face 32, which is not provided with any external cooling in the described embodiments. Without being bound by theory, it is believed that an HSF nozzle not having tapered faces creates recirculation zones of the annular stream of gas as it passes over the bluff body end of the HSF nozzle. This results in rapid mixing of the fuel gas and oxidant, as well as entrainment of furnaces gases, at the outlet face of the HSF nozzle, which causes the flame so that it is essentially attached to the face of the nozzle on either side of the zipper nozzle opening. In contrast, an HSF nozzle 30 having tapered faces 36 and an area ratio $A_F/A_N$ as described herein enables the annular stream of gas to be streamlined radially inward to be entrained into the inner stream of gas, creating a flame that emanates essentially from the nozzle opening 38. This results in less heat being imparted to the outlet face 32.

Figure 7A:
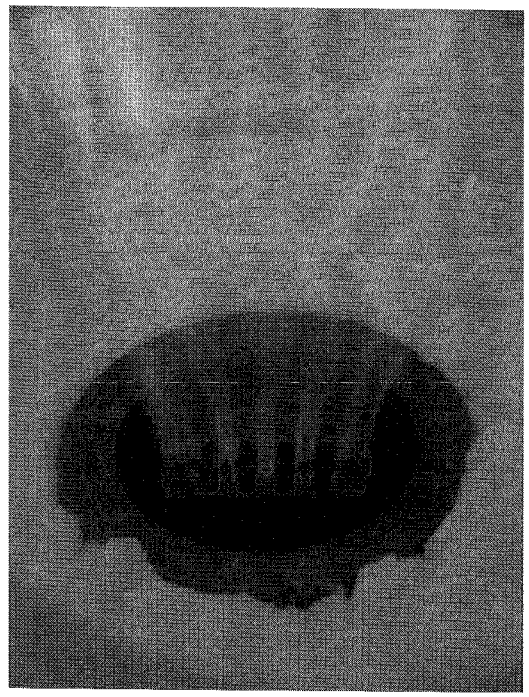
FIGS. 7A and 7B are photographs comparing a flame produced by a high shape factor nozzle with a bluff body tip to a flame produced by a high shape factor nozzle with a tapered tip.
Figure 7B:
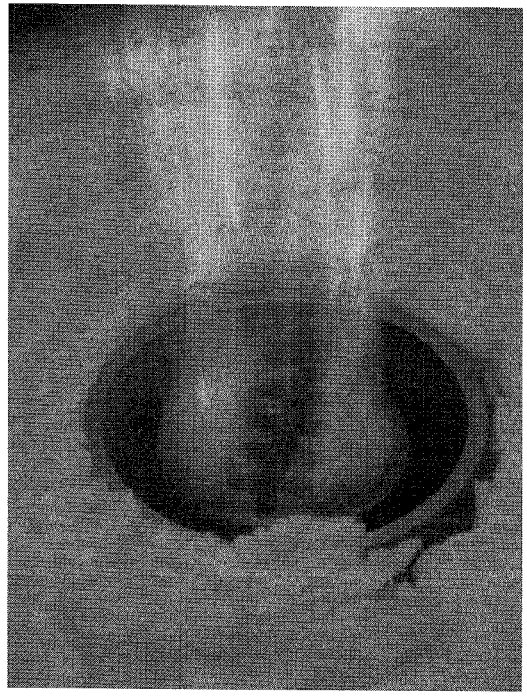

FIGS. 7A and 7B compare the flame characteristics of two burners, the burner in FIG. 7A having an HSF nozzle with a bluff body and no tapered faces (La, $A_F/A_N=1$) and the burner in FIG. 7B having an HSF nozzle 30 as described herein, with tapered faces 36 and an area ratio $A_F/A_N$ of about 51%. In both cases, fuel gas was flowed through the HSF nozzle 30 while oxidant was flowed through the annular nozzle 20. The burner of FIG. 7A exhibits two distinct flames, one on either side of the HSF nozzle opening 38. The photo of FIG. 7A also shows that the outlet face of the HSF nozzle is being heated to the point where it glows. In contrast, the burner of FIG. 7B exhibits one flame emanating from nozzle opening 38, and the outlet face 32 of the HSF nozzle 30 is much cooler and does not glow.

In yet another aspect, the outlet face 32 of the HSF nozzle 30 can be axially offset from the discharge end 22 of the annular nozzle 20 by an offset distance, $X_R$. The distance $X_R$ can be as large as about ±1 diameter, $D_{HSF}$, of the nozzle 30. That is, the outlet face 32 of the HSF nozzle 30 can be recessed by as much as about one diameter $D_{HSF}$ with respect to the discharge end 22, as indicated in FIG. 3A. Recessing the HSF nozzle 30 helps ensure that the inner gas jet (fuel or oxidizer) exiting the nozzle opening 38 is surrounded entirely by the annular gas stream to be entrained (oxidizer or fuel, respectively) and can avoid dilution of the flame root by furnace gases, without overheating the external annular nozzle 20. Recessing the HSF nozzle 30 also enables the fuel and oxidizer flows to mix prior to entraining furnaces gases, thereby minimizing the dilution of the mixing of fuel and oxidizer flows by the furnace gases at the HSF nozzle 30. Otherwise, particularly when the fuel gas and/or oxidant have low momentums, dilution could result in delayed mixing of fuel and oxidizer flows.

Alternatively, the outlet face 32 of the HSF nozzle 30 can protrude by as much as about one diameter $D_{HSF}$ beyond the discharge end 22, particularly for a configuration in which the fuel gas and/or oxidant have high momentums. Still alternatively, the outlet face 32 of the HSF nozzle 30 can be approximately flush or aligned with the discharge end 22.

In still another aspect, the flame volume can be controlled by HSF nozzle velocity and by the ratio of the annular stream velocity to the inner jet velocity. Specifically, flame volume can be enhanced by controlling ratio of the velocity of the outer or annular stream ($V_{ANNULAR}$) to the velocity of the inner stream exiting the HSF nozzle ($V_{HSF}$) to be less than about 3. In one embodiment, the velocity of the annular stream is controlled to be less than the velocity of the inner stream exiting the HSF nozzle, i.e., $V_{ANNULAR}/V_{HSF}<1$. Preferably, the velocity ratio between the annular flow and the inner jet ($V_{ANNULAR}/V_{HSF}$) is about 0.1 to about 1. More preferably, the velocity ratio $V_{ANNULAR}/V_{HSF}$ is approximately 0.3. That is, the inner jet velocity is typically about 30% of the annular flow velocity so that the inner jet entrains the surrounding annular gas flow to create good mixing and, in turn, a relatively voluminous flame. In one example, the inner jet velocity can be less than or equal to about 600 ft/s (e.g., about 100 ft/s to about 300 ft/s), and the annular flow velocity can correspondingly be less than or equal to about 600 ft/s, and preferably less than or equal to about 180 ft/s (e.g., about 30 ft/s to about 90 ft/s).

In a further aspect, the slots of the HSF nozzle 30 can have an expansion angle (described below in more detail with reference to FIGS. 9 and 11), in order to mix effectively with the annular stream and to generate a "bushy" flame to enhance radial coverage of the flame.

Figure 8:
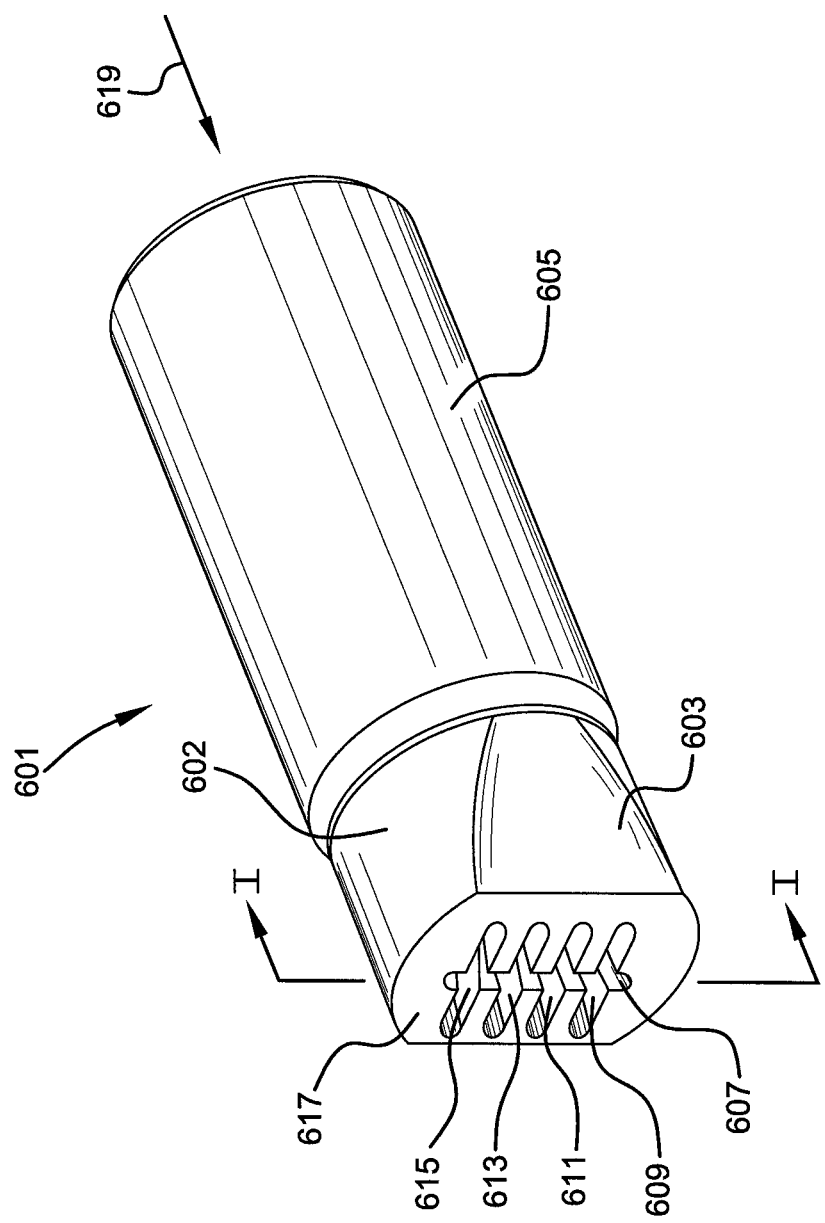
FIG. 8 is a perspective view of a high shape factor nozzle assembly for use in a rapid energy release burner.

Shapes and designs of nozzles suitable for use in the embodiments described above are described in U.S. Pat. No. 6,866,503 B2, which is incorporated herein by reference. One of these nozzle designs is illustrated in FIG. 8. A nozzle assembly 601 comprises a nozzle body 602 having tapered faces 603 and an outlet face 617, the nozzle body 602 being joined to nozzle inlet conduit or pipe 605. The nozzle assembly 601 is analogous to the HSF nozzle 30 described with reference to FIGS. 1-3B. A central slot 607, illustrated here as vertically-oriented, is intersected by cross slots 609, 611, 613, and 615. As described in detail below, the lengthwise direction of the central slot 607 (i.e., a major axis of the HSF nozzle 30) defines a central plane extending generally axially outward from the outlet face 617. The slots are disposed between the outlet face 617 and an inlet face (not shown) at the connection between the nozzle body 603 and the nozzle inlet pipe 605. A first gas (one of fuel and oxygen) 619 flows through the nozzle inlet pipe 605 and through the slots 607, 609, 611, 613, and 615, and then mixes with a second gas (the other of fuel and oxygen) flowing in the annular stream surrounding the slot outlets. The opening formed by slots 607, 609, 611, 613, and 615 forms the HSF nozzle 30 as earlier described.

In addition to the slot pattern shown in FIG. 8, other slot patterns are possible as described later. Also, the nozzle 601 assembly can be used in any orientation and is not limited to the generally horizontal orientation shown. In the depicted exemplary embodiment, when viewed in a direction perpendicular to outlet face 617, exemplary slots 609, 611, 613, and 615 intersect slot 607 at right angles. Other angles of intersection are possible between exemplary slots 609, 611, 613, and 615 and slot 607. Similarly, when viewed in a direction perpendicular to outlet face 617, exemplary slots 609, 611, 613, and 615 are parallel to one another; however, other embodiments are possible in which one or more of these slots are not parallel to the remaining slots.

The term "slot" as used herein is defined as an opening through a nozzle body or other solid material wherein any slot cross-section (i.e., a section perpendicular to the inlet flow axis defined below) is non-circular and is characterized by a major axis and a minor axis. The major axis is longer than the minor axis and the two axes are generally perpendicular. For example, the major cross-section axis of any slot in FIG. 8 extends between the two ends of the slot cross-section; the minor cross-section axis is perpendicular to the major axis and extends between the sides of the slot cross-section. The slot may have a cross-section of any non-circular shape and each cross-section may be characterized by a center point or centroid, where centroid has the usual geometric definition.

A slot may be further characterized by a slot axis defined as a straight line connecting the centroids of all slot cross-sections. In addition, a slot may be characterized or defined by a center plane which intersects the major cross-section axes of all slot cross-sections. Each slot cross-section may have perpendicular symmetry on either side of this center plane. The center plane extends beyond either end of the slot and may be used to define the slot orientation relative to the nozzle body inlet flow axis as described below.

Figure 9:
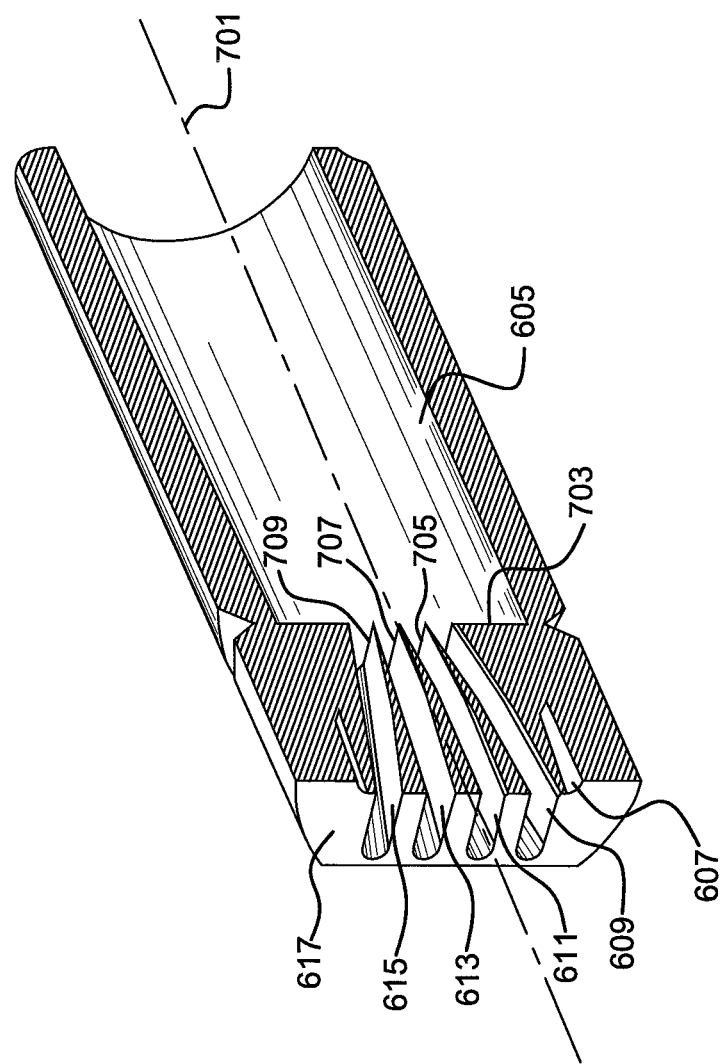
FIG. 9 is a cross-sectional perspective view of axial section I-I of the nozzle of FIG. 8.

Axial section I-I of the nozzle 601 of FIG. 8 is given in FIG. 9. An inlet flow axis 701 passes through the center of the nozzle inlet pipe 605, the inlet face 703, and the outlet face 617. In this embodiment, the center planes of slots 609, 611, 613, and 615 lie at angles to the inlet flow axis 701 such that gas flows from the slots at outlet face 617 in diverging directions from the inlet flow axis 701. The center plane of slot 607 (only a portion of this slot is seen in FIG. 9) also lies at an angle to the inlet flow axis 701. As will be seen later, this exemplary feature can direct the inner gaseous stream from the nozzle outlet face 617 in another diverging direction from the inlet flow axis 701. In this exemplary embodiment, when viewed in a direction perpendicular to the axial section of FIG. 9, slots 609 and 611 intersect at the inlet face 703 to form sharp edge 705, slots 611 and 613 intersect to form sharp edge 707, and slots 613 and 615 intersect to from sharp edge 709. These sharp edges provide aerodynamic flow separation to the slots and reduce pressure drop associated with bluff bodies. Alternatively, these slots may intersect at an axial location between the inlet face 703 and the outlet face 617, and the sharp edges would be formed within the nozzle body 603. Alternatively, these slots may not intersect when viewed in a direction perpendicular to the axial section of FIG. 9, and no sharp edges would be formed.

The term "inlet flow axis" as used herein is an axis defined by the flow direction of fluid entering the HSF nozzle at the inlet face, wherein this axis passes through the inlet and outlet faces. Typically, but not in all cases, the inlet flow axis is perpendicular to the center of the nozzle inlet face 703 and/or the outlet nozzle face 617, and meets the faces perpendicularly. When the nozzle inlet pipe 605 is a typical cylindrical conduit as shown, the inlet flow axis may be parallel to or coincident with the conduit axis.

The axial slot length is defined as the length of a slot between the nozzle inlet face and the nozzle outlet face, for example, between the inlet face 703 and the outlet face 617 of FIG. 9. The slot height is defined as the perpendicular distance between the slot walls at the minor cross-section axis. The ratio of the axial slot length to the slot height may be between about 1 and about 20.

The multiple slots in a nozzle body may intersect in a plane perpendicular to the inlet flow axis. As shown in FIG. 8, for example, the cross slots 609, 611, 613, and 615 intersect the central slot 607 at right angles. If desired, these slots may intersect in a plane perpendicular to the inlet flow axis at angles other than right angles. Adjacent slots also may intersect when viewed in a plane parallel to the inlet flow axis, i.e., the section plane of FIG. 9. As shown in FIG. 9, for example, the slots 609 and 611 intersect at the inlet face 703 to form the sharp edge 705 as earlier described. The angular relationships among the center planes of the slots, and also between the center plane of each slot and the inlet flow axis, may be varied as desired. This allows the inner gas stream to be discharged from the nozzle in any selected direction relative to the nozzle axis.

Additional views of an exemplary nozzle body 603 are given in FIGS. 10A to 10D. FIG. 10A is a front perspective view of the nozzle body; FIG. 10B is a view of section II-II of FIG. 10A and illustrates the angles formed between the center planes of the slots and the inlet flow axis. Angle $\alpha_1$ is formed between the center plane of slot 615 and inlet flow axis 701 and angle $\alpha_2$ is formed between the center plane of slot 609 and inlet flow axis 701. Angles $\alpha_1$ and $\alpha_2$ may be the same or different, and may be in the range of 0 to about 30 degrees. Angle $\alpha_3$ is formed between the center plane of slot 611 and inlet flow axis 701 and angle $\alpha_4$ is formed between the center plane of slot 613 and inlet flow axis 701. Angles $\alpha_3$ and $\alpha_4$ may be the same or different, and may be in the range of 0 to about 30 degrees. The center planes of any two adjacent other slots may intersect at an included angle of between 0 and about 15 degrees.

FIG. 10C is a view of section of FIG. 10A which illustrates the angle $\beta_1$ formed between the center plane of slot 607 and inlet flow axis 701. Angle $\beta_1$ may be in the range of 0 to about 30 degrees. The outer edges of slot 611 (as well as slots 609, 613, and 615) may be parallel to the center plane of slot 607.

FIG. 10D is a rear perspective drawing of the nozzle body of FIGS. 7 and 8 which gives another view of sharp edges 705, 707, and 709 formed by the intersections of slots 609, 611, 613, and 615.

Figure 11:
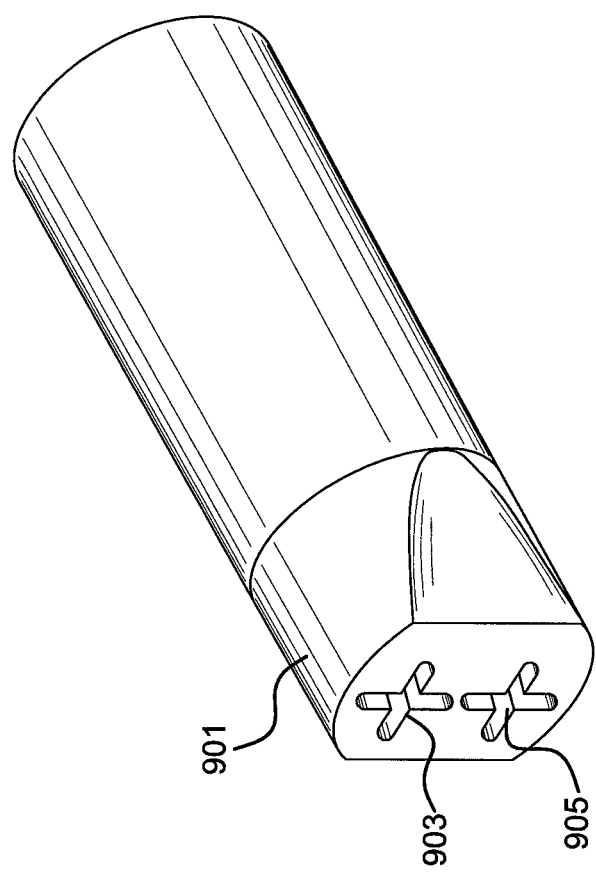
FIG. 11 is a perspective view of an alternative high shape factor nozzle assembly for use in a rapid energy release burner.
Figure 12A:
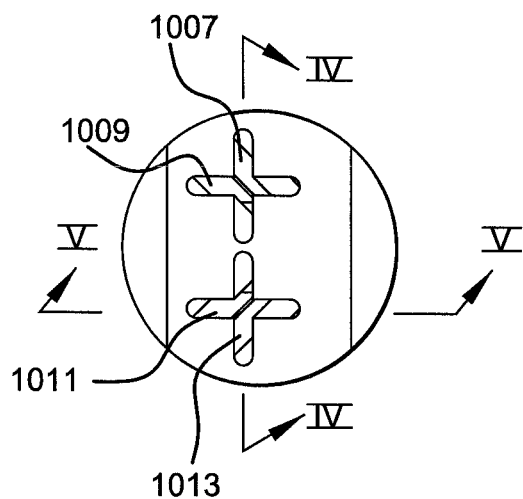
FIG. 12A is a front view of the nozzle body of FIG. 11 showing the discharge end or nozzle of the nozzle body.
Figure 12B:
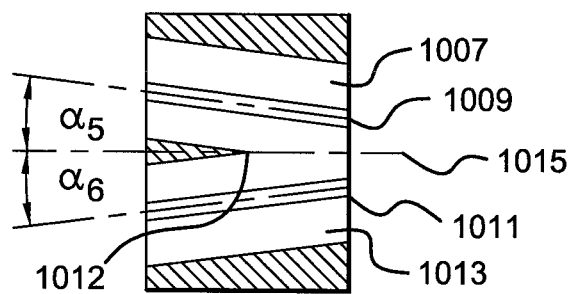
FIG. 12B is a cross-sectional view of section IV-IV of FIG. 12A.

Another type of nozzle is illustrated in FIG. 11 in which the slots in nozzle body 901 are disposed in the form of two crosses 903 and 905. A front perspective view of the nozzle body is shown in FIG. 12A in which cross 903 is formed by slots 1007 and 1009 and cross 905 is formed by slots 1001 and 1013. A view of section IV-IV of FIG. 12A shown in FIG. 12B shows the center planes of slots 1009 and 1011 diverging from inlet flow axis 1015 by angles $\alpha_5$ and $\alpha_6$.

Angles $\alpha_5$ and $\alpha_6$ may be the same or different and may be in the range of 0 to about 30 degrees. The outer edges of slot 1007 may be parallel to the center plane of slot 1009 and the outer edges of slot 1013 may be parallel to the center plane of slot 1011. In this embodiment, slots 1007 and 1011 intersect to form sharp edge 1012.

Figure 12C:
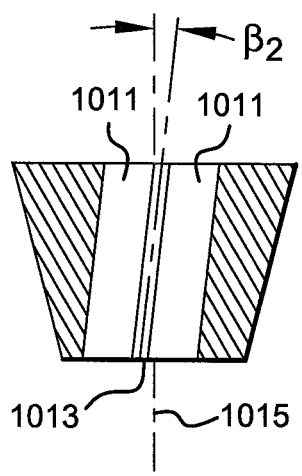
FIG. 12C is a cross-sectional view of section V-V of FIG. 12A.

A view of section V-V of FIG. 12A is shown in FIG. 12C, which illustrates how the center plane of slot 1013 diverges from inlet flow axis 1015 by included angle $\beta_2$, which may be in the range of 0 to about 30 degrees. The outer edges of slot 1011 may be parallel to the center plane of slot 1013.

As described above, slots may intersect other slots in either or both of two configurations. First, slots may intersect when seen in a view perpendicular to the nozzle body outlet face (see, for example, FIG. 10A or 12A) or when seen in a slot cross-section (i.e., a section perpendicular to the inlet flow axis between the inlet face and outlet face). Second, adjacent slots may intersect when viewed in a section taken parallel to the inlet flow axis (see, for example, FIGS. 9, 10B, and 12B). An intersection of two slots occurs by definition when a plane tangent to a wall of a slot intersects a plane tangent to a wall of an adjacent slot such that the intersection of the two planes lies between the nozzle inlet face and outlet face, at the inlet face, and/or at the outlet face. For example, in FIG. 9, a plane tangent to a wall of slot 609 intersects a plane tangent to a wall of slot 607 and the intersection of the two planes lies between inlet face 703 and outlet face 617. A plane tangent to upper wall of slot 609 and a plane tangent to the lower wall of slot 611 intersect at edge 705 at inlet face 703. In another example, in FIG. 12B, a plane tangent to the upper wall of slot 1013 and a plane tangent to the lower wall of slot 1007 intersect at edge 1012 between the two faces of the nozzle.

Each of the slots in the exemplary embodiments described above has generally planar and parallel internal walls. Other embodiments are possible in which the planar walls of a slot may converge or diverge relative to one another in the direction of fluid flow. In other embodiments, the slot walls may be curved rather than planar. Each of the slots in the exemplary embodiments described above has a generally rectangular cross-section with straight sides and curved ends.

Figure 14:
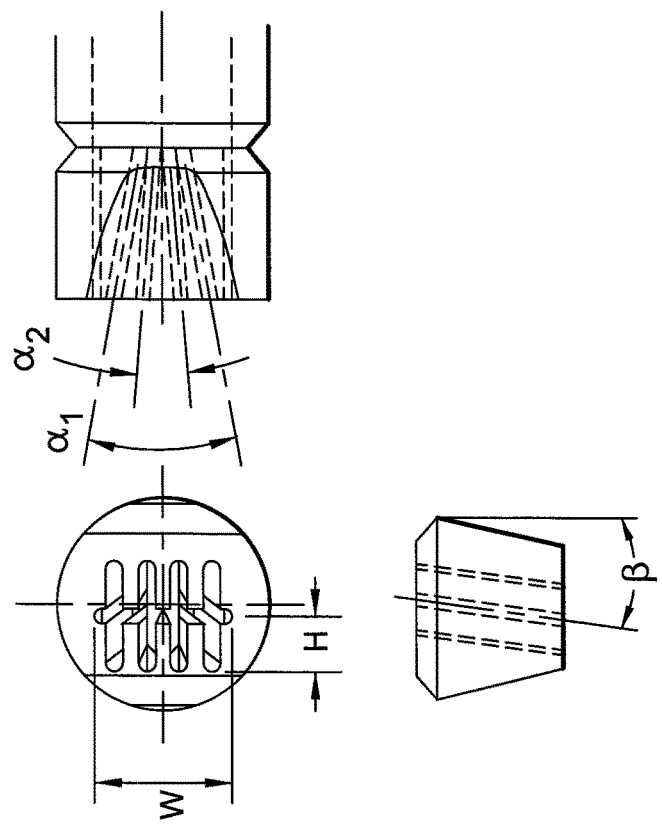
FIG. 14 presents definitions of various geometrical design parameters of the nozzle body of FIGS. 10A, 10B, and 10C.
Figure 13:
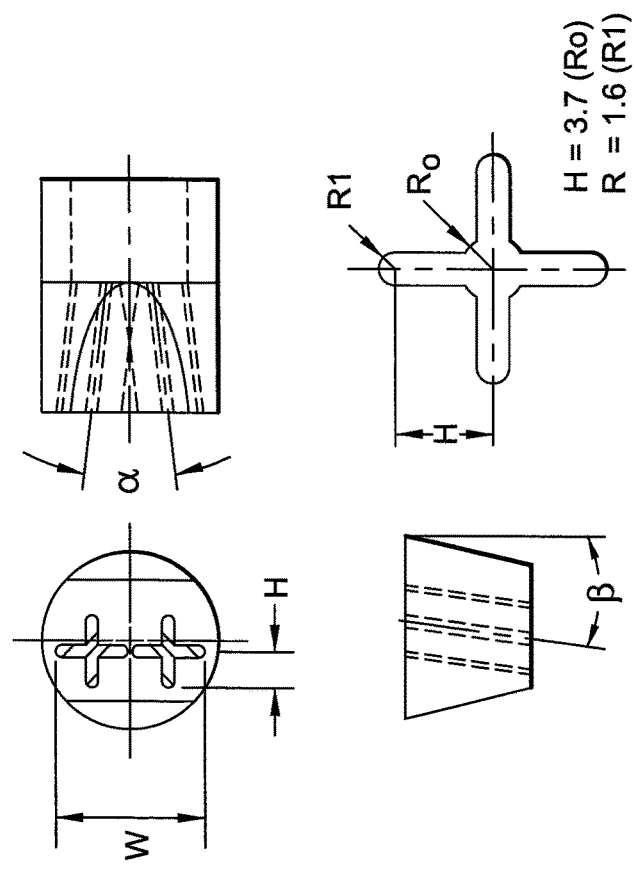
FIG. 13 presents definitions of various geometrical design parameters of the nozzle body of FIGS. 12A, 12B, and 12C.

Both cross- and zipper-shaped nozzles described above provide improved performance compared to traditional circular nozzles in terms of rapid mixing; this improvement is directly related to improved energy release to the furnace as a result of using these exemplary nozzle geometries. Table 2 gives typical ranges of the geometric design parameters for these nozzles which are useful to effect significant mixing of fuel and oxidant streams, which enhances the rapidity of combustion energy release. The design parameters are defined in FIGS. 13 and 14.

TABLE 2

| | Typical Ranges for Nozzle Design Parameters (FIGS. 13 and 14) | | | | | |
|---|---|---|---|---|---|---|
| Secondary Fuel Nozzle Type | (H) Slot Height, (inch) | (W) Slot Width, (inch) | ($R_e$/R1) Slot end radius to center radius ratio | (H/$R_o$) Slot height to corner radius ratio | ($\alpha$, $\alpha_1$, $\alpha_2$) Axial divergence angle, degrees | ($\beta$) Radial divergence angle, degrees |
| Cross Nozzle (FIG. 13) | (1/32-1) | (1/4-2) | (1-3) | (2-6) | (0-30) | (0-30) |
| Zipper Nozzle (FIG. 14) | (1/32-1) | (1/4-2) | (1-3) | (2-6) | (0-30) | (0-30) |

Figure 5B:
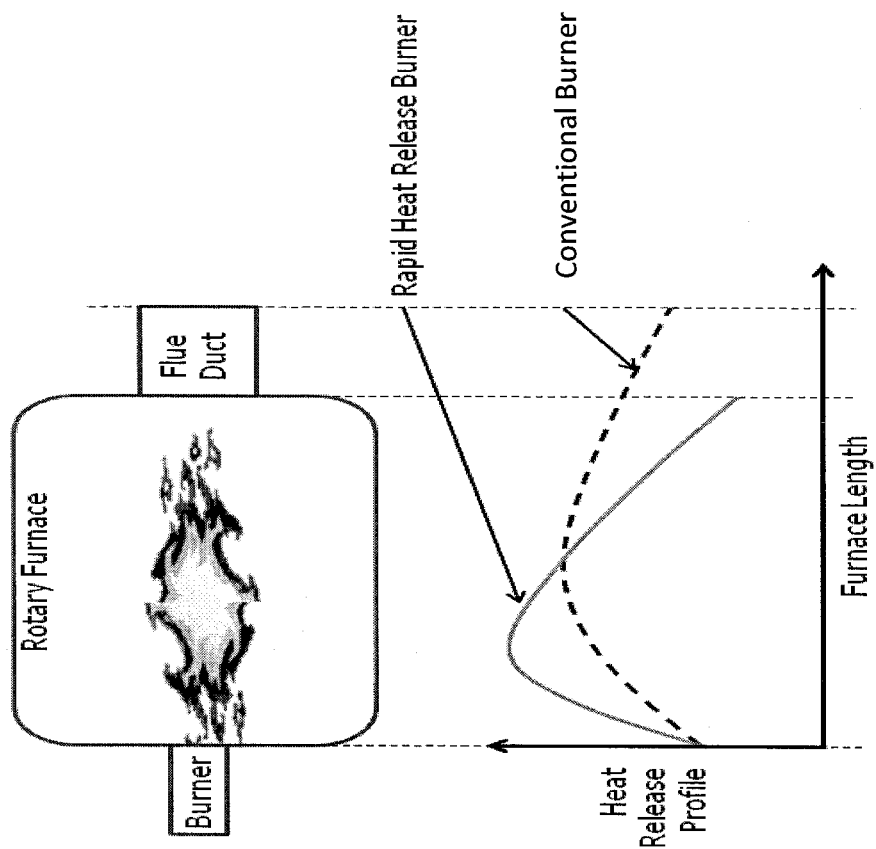
FIG. 5B is a graph, superimposed with a graphic of an exemplary rotary furnace into which a burner is installed, illustrating the heat flux versus length of a conventional burner in comparison to a rapid energy release burner including a high shape factor nozzle surrounded by an annular nozzle.
Figure 6:
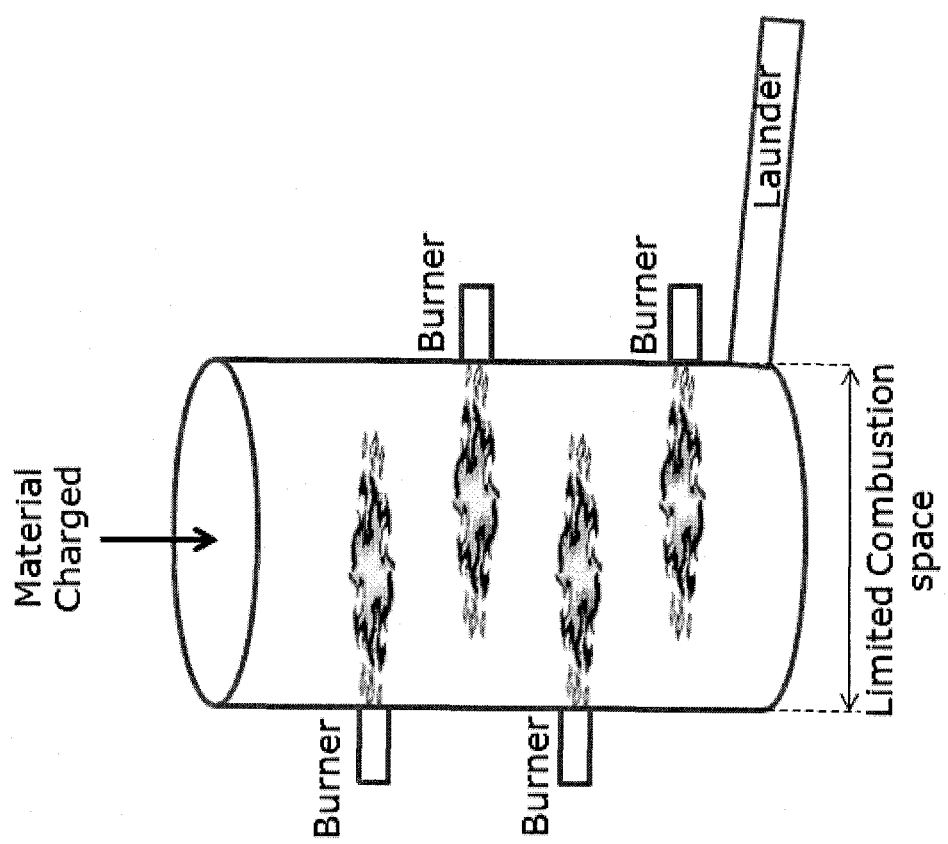
FIG. 6 is a plan view of an exemplary furnace, such as a shaft furnace or cupola, having a large length to width ratio and multiple burners firing laterally along the width of the furnace with limited combustion space.

The benefits of a rapid release burner can be realized particularly when the combustion time or space is limited, for example in single-pass furnaces (FIG. 5B), in processes where scrap is located very close to the burner outlet, and in furnaces with large aspect ratios, where burners are fired along the width of the furnace, such as shaft furnaces and cupolas (FIG. 6).

An exemplary rapid energy release burner, as shown in FIGS. 1-3B, was operated in a test furnace to obtain a comparison between the rapid energy release burner and a conventional pipe-in-pipe type oxy-fuel burner shown in FIG. 21.4 of the previously identified Industrial Burners Handbook. A photographic comparison of the flame shape of the conventional burner (FIG. 4A) and the rapid energy release burner (FIG. 4B) was conducted via photographs taken through a circular window located close to the burner exit. In this case, fuel (natural gas) was provided to the HSF nozzle and oxidizer (oxygen) was provided to the annular nozzle. The directions of fuel flow (natural gas) and oxidizer (oxygen) flow, and thus the flame orientation, are indicated in the figures. FIG. 4B clearly shows a much bushier and voluminous flame near the burner exit as compared with FIG. 4A. Without wishing to be bound by any theory or explanation, it is apparent that the rapid mixing of natural gas and (in this case) oxygen just outside the burner exit results in the flame being relatively voluminous in comparison to that obtained by the conventional oxy-fuel burner.

Because of effective mixing induced by the rapid energy release nozzle arrangement, the energy release profile along the length of the furnace becomes more concentrated and can be controlled to achieve a desired heat flux. FIG. 5A shows a comparison between the heat flux profiles obtained from the conventional oxy-fuel and rapid energy release burners in the test furnace. FIG. 5A illustrates that the rapid energy release burner can achieve a heat flux profile that is provides a peak heat flux closer to the burner exit than a conventional burner, and that provides a larger integrated heat flux within the first six feet of the burner exit than a conventional burner. Also, more rapid energy release may allow shortening of the furnace, may result in lower flue gas temperatures, and may allow lower firing rates (and thus provide fuel savings) to achieve the same net het flux.

Figure 5A:
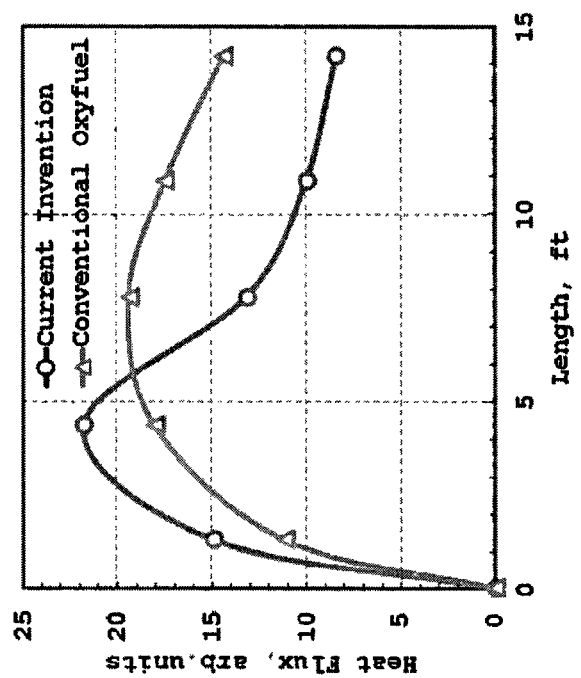
FIG. 5A is a graph of heat flux versus furnace length in a test furnace, comparing the heat release profile of a rapid energy release burner to a conventional pipe-in-pipe oxy-fuel burner.

An exemplary rapid release burner, as shown in FIGS. 1-3B, was also installed in two single-pass rotary type furnaces for melting a metal charge, which are schematically depicted in the upper portion of FIG. 5B. When these furnaces were operated with a different (conventional) oxy-fuel burner, the flue gas duct refractory required frequent repair, a problem that was attributed to incomplete combustion within the confines of the furnace and overheating of the flue gas duct. But when the same furnaces were operated with a rapid energy release burner, the flue gas duct operated at lower temperatures and the metal was tapped out at higher temperatures using the burner same firing rates as with the conventional burner. A representative graph of heat flux is provided in FIG. 5B, showing a higher integrated heat flux within the furnace and a lower heat flux by the time the combustion gases reach the flue gas duct. In other words, the rapid energy release burner was able to release more combustion energy within the furnace confines as a result of rapid mixing than the conventional burner system in which the fuel and oxidizing gases continued to combust and release energy into the flue gas duct. Therefore, not only was the rapid energy release burner able to reduce damage to the flue gas duct refractory, but fuel usage was able to be reduced by about 10%, and oxygen usage by about 10% to about 15%, while still achieving the same net heat flux to the metal within the furnace.

It has been determined that a predetermined heat flux profile can be achieved by using the rapid energy release burner by varying the high shape factor nozzle shapes and arrangements, and by controlling nozzle velocity and velocity ratios. In that way, the flame volume and release of energy can be tailored to particular applications and furnaces.

Note that in the exemplary embodiments described above, fuel was provided in the HSF nozzle and oxidant was provided in the annular nozzle. However, if desired, the flow of fuel and oxidant can be reversed, and similar beneficial results are expected.

The rapid energy release burner can be used in a wide range of applications wherein it is desired to have a voluminous flame, and defined heat flux and energy release. For example, the burner including an HSF nozzle surrounded by an annular nozzle can be used in all applications related to melting and reheating of metals (e.g., aluminum, iron & steel, copper, lead, zinc, among other materials) including heating in rotary furnaces, reverberatory furnaces, soaking pits, and shaft furnaces, as well as other furnaces. In one aspect, the rapid energy release burner can be employed in applications that involve non-uniform (or lopsided) loading of metal scrap or parts (such as ingots and blooms) into the furnace.

Figure 15:
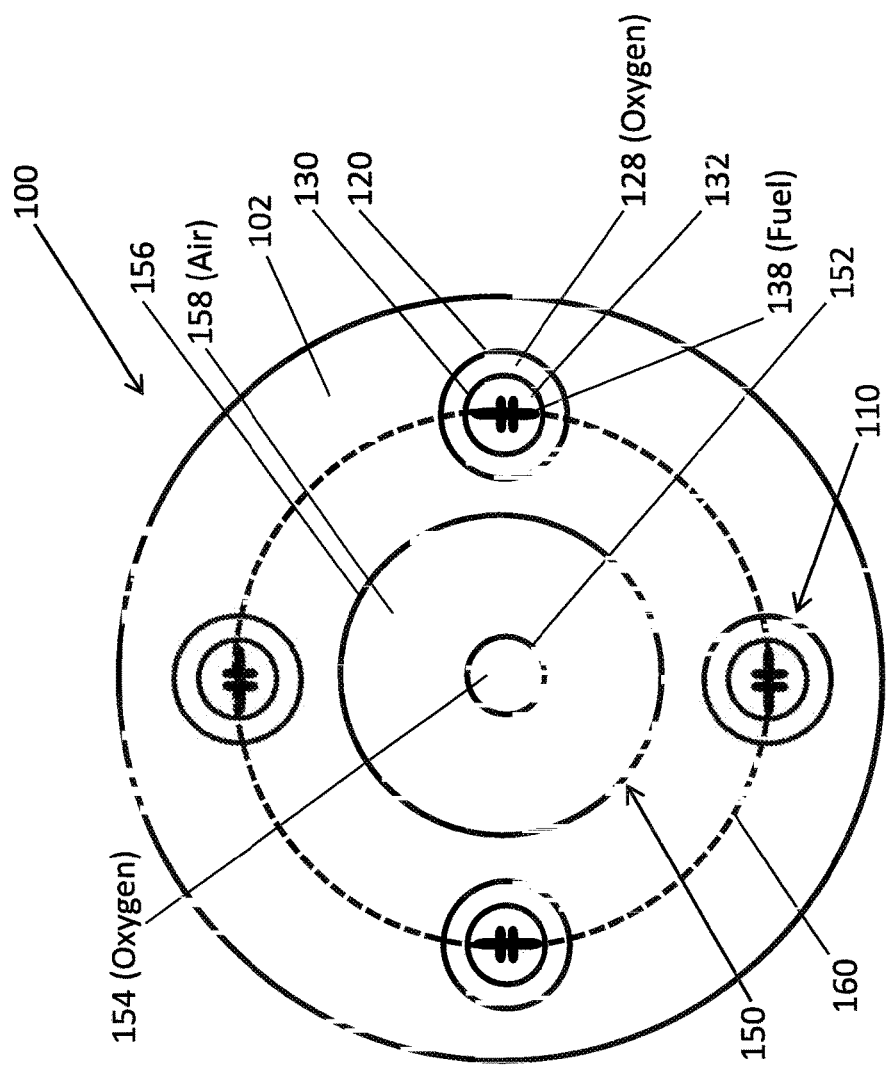
FIG. 15 is an end view of an embodiment of a staged oxy-fuel burner having high shape factor flame holders spaced around a periphery of an air nozzle with a central oxidant staging nozzle.

An embodiment of a staged burner 100 is shown in FIG. 15. The burner 100 includes several nozzles contained within a burner body 102. A central oxidant nozzle 150 is surrounded by a plurality of flame holders 110. In the depicted embodiment, four flame holders 110 are illustrated. However, it is understood that the burner 100 can be configured to have any number of flame holders 110, for example as few as one and as many as a dozen, depending on the size of the burner and the application. Preferably, the burner 100 has at least two flame holders 110, at least three flame holders 110, at least four flame holders 110, or at least five flame holders 100. The flame holders 110 may be spaced equally around the periphery of the oxidant nozzle 150 (i.e., spaced approximately equally apart from each other), or they may be asymmetrically spaced to achieve a desired flame shape or characteristic.

The oxidant nozzle 150 includes a central conduit 152 forming a central oxidant staging nozzle 154, and an outer conduit 156 forming an annular nozzle 158 that surrounds the central staging nozzle 154. In operation, staging oxidant is typically flowed through the central staging nozzle 154, and air may be flowed through the annular nozzle 158 in combination with, or as an alternative to, staging oxidant flowed through the central oxidant nozzle 154. The oxidant nozzle 150 is centered about a central axis of the burner 100.

The plurality of flame holders 110 are positioned at approximately the same radial distance (denoted by circle 160) from the central axis of the burner 100. Each flame holder 110 may be constructed in the same manner as the rapid energy release burner 10 and the nozzle assembly 601 described above. For example, as shown, the flame holder 110 includes an annular nozzle 120 surrounding a high shape factor nozzle 130, the annular nozzle 120 surrounding an annular nozzle opening 128 and the high shape factor nozzle 130 including a high shape factor nozzle opening 138 through an outlet face 132. The configuration of the HSF nozzle opening 138 may be varied to have a central slot and more or less cross-slots (for example, an HSF nozzle with two cross-slots is shown in FIGS. 15-18), and the slots may be angled or straight, depending on the application.

Exemplary HSF nozzle openings 138 are configured asymmetrically as described above with respect to the burner 10 and the nozzle body 601, in which a central slot is intersected by two or more cross-slots each having a length shorter than that of the central slot. The orientation of the HSF nozzle itself can be defined by the orientation of the axis of the central slot with respect to the central axis of the burner. In one embodiment of a burner 100a, as shown in FIG. 17A, the flame holders 110 are oriented so that the central axes of the HSF nozzle central slots form a box configuration, or a corresponding geometrical configuration when there are less than or more than four flame holders 110. In this configuration, the central axis of each HSF nozzle central slot is tangent to the circle 160 around the central axis of the burner, or, described alternatively, is perpendicular to a radius extending out from the central axis of the burner. In another embodiment of a burner 100b as shown in FIG. 17B, the flame holders 110 are oriented so that the central axes of the HSF nozzle central slots form a cross configuration, or more generally a spoked configuration when there are any number of flame holders 110. The heat flux and NOx characteristics of the burner may change as the orientation of the flame holders 110 is changed. In other embodiments, the flame holders 110 can be oriented with the HSF nozzle central axis at any angle with respect to a radius extending outward from the central axis of the burner; the flame holder orientation 110 is not restricted to the box and cross variations shown in FIGS. 17A and 17B. Further, all of the flame holders 110 need not be oriented in the same way within the burner. For example, one or more flame holders 100 may be oriented with its central axis intersecting the central axis of the burner, one or more flame holders 110 may be oriented with its central axis perpendicular to a radius extending from the central axis of the burner, and one or more flame holders 110 may be oriented at an angle in between those two positions, all within the same burner 100.

The orientation of the flow exiting the HSF nozzle opening can be defined by the angular orientation of the center plane of the central slot, which may be at an angle $\beta$ with respect to an inlet flow axis (or an angle of $(90°-\beta)$ with respect to the outlet face of the HSF nozzle), as discussed above in detail with reference to FIGS. 10, 12, 13, and 14.

Figure 19:
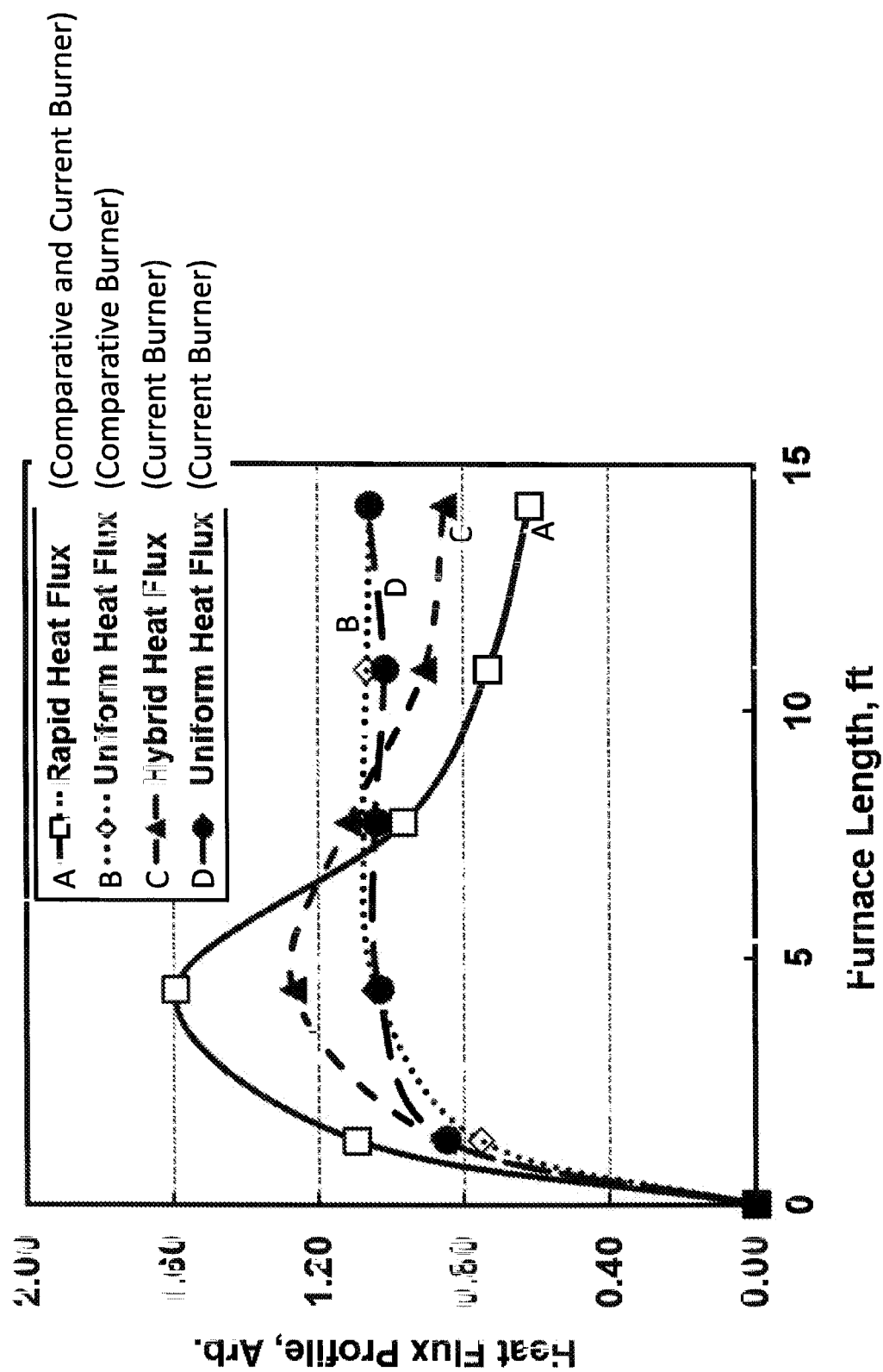
FIG. 19 is a graph showing a comparison of the heat flux profile for various embodiments and operational parameters of a staged oxy-fuel burner and comparative burners.

To obtain a desired heat flux profile, NOx production level, and other operating characteristics, a staged oxy-fuel burner as described herein can be operated in many different modes, including full oxy-fuel with or without staging, air-oxy-fuel, near air-fuel, and full air-fuel. FIG. 19 compares four heat flux profiles (discussed in more detail below), including curve (A) corresponding to the rapid energy release burner 10, curve (B) corresponding to a reference uniform heat flux burner as described in US 2003/0148236, curve (C) corresponding to one mode of operation of an embodiment of a staged oxy-fuel burner that achieves a hybrid heat flux profile, and curve (D) corresponding to another mode of operation of an embodiment of a staged oxy-fuel burner that achieves a uniform heat flux profile very similar to curve (B).

When discussing a burner 100 herein, it is understood that the burner 100 can have various configurations, including those represented as burners 100a, 100b, 200a, 200b, and 300 in FIGS. 16A-18. In one oxy-fuel mode of operation, it is expected that a burner 100 can be operated to produce a heat flux profile very similar to that shown in FIG. 5 for a single rapid energy release burner 10. For reference, the same heat flux curve is shown as curve (A) in FIG. 19. In this mode, the burner 100 would be operated with an approximately stoichiometric ratio of oxidizer gas and fuel gas flowed through the flame holders 110, with no air provided via the air nozzle 158 and no staging oxygen provided via the oxygen staging nozzle 152, and the HSF nozzles 30 in the flame holders 110 would have an angle $\beta$ of about 0°. Such a burner would be expected to perform similarly to several rapid energy release burners 10 operating in conjunction, although the heat flux profile will undoubtedly be affected by the proximity of the individual flame holders 110 to each other, which will affect the extent to which the several combustion zones interact. It is noted that in this mode of operation, an air nozzle 158 and an oxygen staging nozzle 152 need not be physically present in the burner, since they are not used.

In another oxy-fuel mode of operation, a burner 100 was operated with an approximately stoichiometric ratio of oxidizer gas and fuel gas flowed through the flame holders 110, with no air provided via the air nozzle 158 and no staging oxygen provided via the oxygen staging nozzle 152, and with the HSF nozzles 30 in the flame holders 110 having an angle $\beta$ of about 3° radially inward. Surprisingly, the resultant heat flux profile, depicted as curve (C) in FIG. 19, was substantially flattened (i.e., more uniform) than for the rapid heat flux burner as indicated by curve (A). Based on this result, it is believed that the shape and peak location of the heat flux profile can be controlled by adjusting the angle $\beta$ at which the central plane of the high shape factor nozzle opening 138 is angled radially inward or outward, from about 30° radially inward to about 30° radially outward, and preferably from about 10° radially inward to about 10° radially outward, and more preferably from slight greater than 0° radially inward to about 10° radially inward. It is noted that in this mode of operation, an air nozzle 158 and a central oxidant staging nozzle 154 need not be physically present in the burner, since they are not used.

Figure 18:
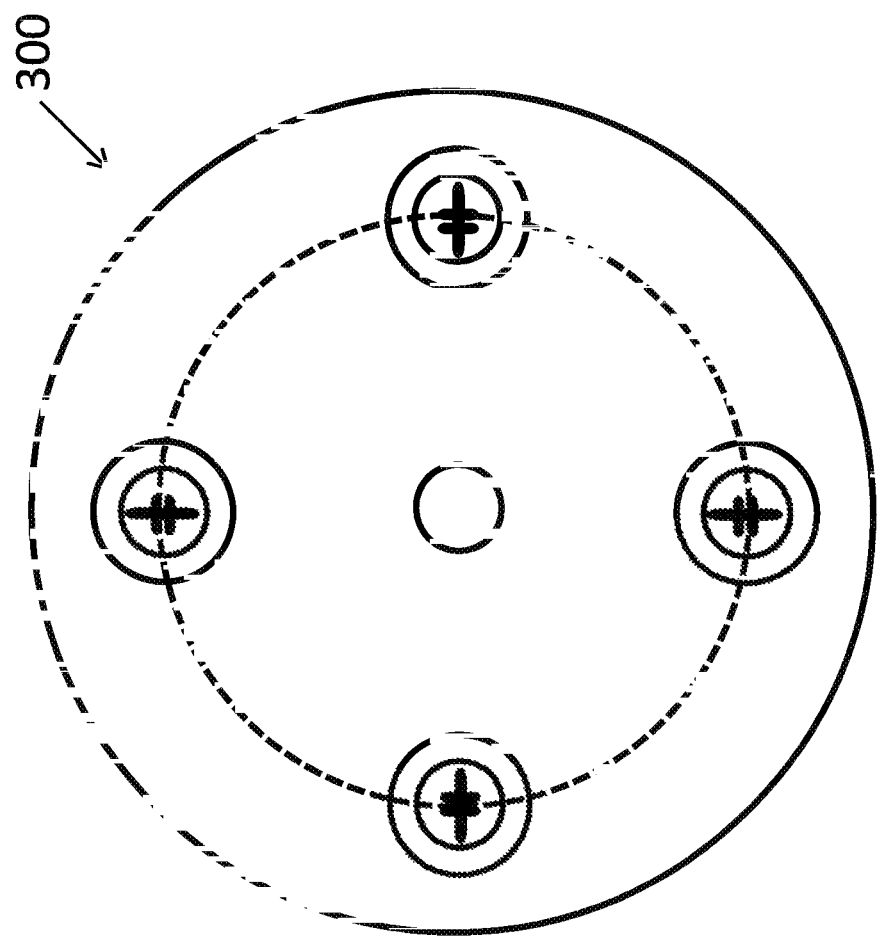
FIG. 18 is an end view of an embodiment of a staged oxy-fuel burner with a central oxidant staging nozzle and high shape factor flame holders surrounding and spaced apart from the staging nozzle.

In yet another oxy-fuel mode of operation, a burner as shown in FIG. 15 was operated with a substoichiometric amount of oxygen supplied by oxidant flowing through the annular nozzle openings 138 in the flame holders 110 and the stoichiometric balance of oxygen supplied by oxidant flowing through the central oxidant staging nozzle 154. It was found that by increasing the proportion of staging oxygen, the heat release profile could be substantially flattened. In a furnace below the auto-ignition temperature, the burner was operated stably at staging levels from about 0% (i.e., essentially 100% of the stoichiometric oxygen requirement supplied via the flame holders 110 and essentially 0% of the stoichiometric oxygen supplied via the central staging nozzle 154) to as high as about 95% (i.e., only about 5% of stoichiometric oxygen supplied via the flame holders and about 95% of the oxygen supplied via the central staging nozzle 154). In a furnace at or above the auto-ignition temperature (e.g., about 1250° F. for natural gas), the burner could be operated stably with only fuel gas supplied through the flame holders 110, essentially 100% of the stoichiometric oxygen requirement supplied via the central staging nozzle 154, and essentially 0% of the stoichiometric oxygen supplied via the flame holders 110. In one example, at a staging level of about 75%, a nearly uniform heat flux profile was obtained, shown as curve (D) in FIG. 19. In this mode of operation, the angle $\beta$ is preferably about 0°. It is believed that relatively uniform heat flux profiles and reduced NOx production can be obtained in this mode of operation with staging levels from about 50% to about 90%, and preferably from about 60% to about 80%. It is noted that in this mode of operation, since oxygen is staged without the use of air, the a central oxidant staging nozzle 154 is used but an air nozzle 158 need not be physically present. An example of such a burner 300 is shown in FIG. 18.

In an air-oxy-fuel mode of operation, the burner can be operated with levels of enrichment in the oxidant nozzle 150 between air (i.e., 20.8%) and nearly pure oxygen (i.e., approaching 100% oxygen). Regardless the level of enrichment, a staged burner as described herein has been shown to produce significantly lower NOx than existing oxy-fuel and air-oxy-fuel burners over the entire range of oxygen enrichment. It is well known that NOx production in air-oxy-fuel combustion typically peaks at an enrichment level of about 35% to about 50%, with NOx production decreasing at lower enrichment levels due to lower flame temperatures and at higher enrichment levels due to diminished availability of nitrogen.

Figure 20:
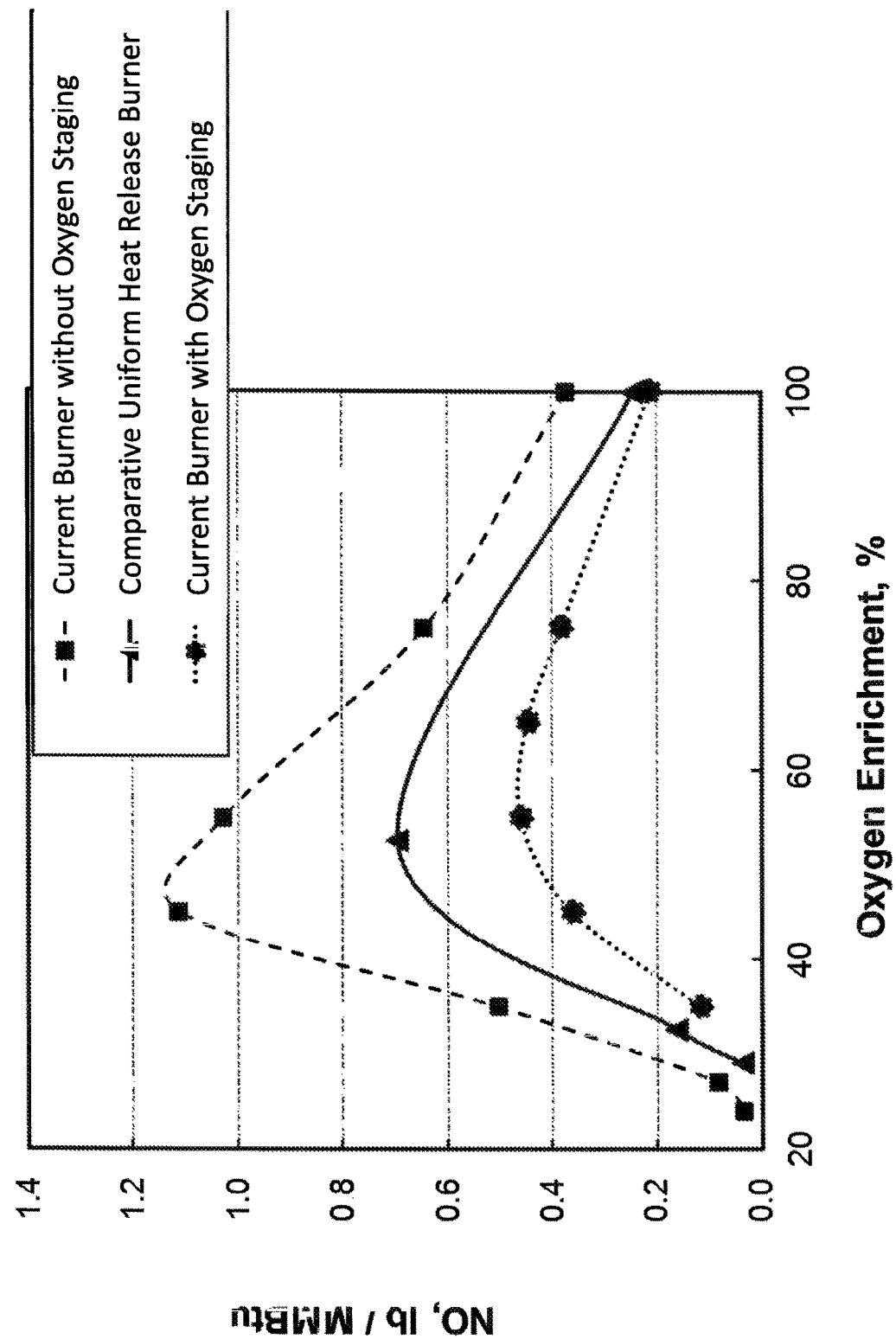
FIG. 20 is a graph showing a comparison of the flue gas NO concentration across oxygen enrichment levels for embodiments of a staged oxy-fuel burner and a comparative burner.

FIG. 20 compares the flue gas concentration of NO for three different scenarios. The middle curve, marked with triangle symbols, shows the NO profile for a comparative uniform heat release burner (i.e., a burner as described in US 2003/0148236) that generated the uniform heat release curve (B) in FIG. 19.

Figure 16B:
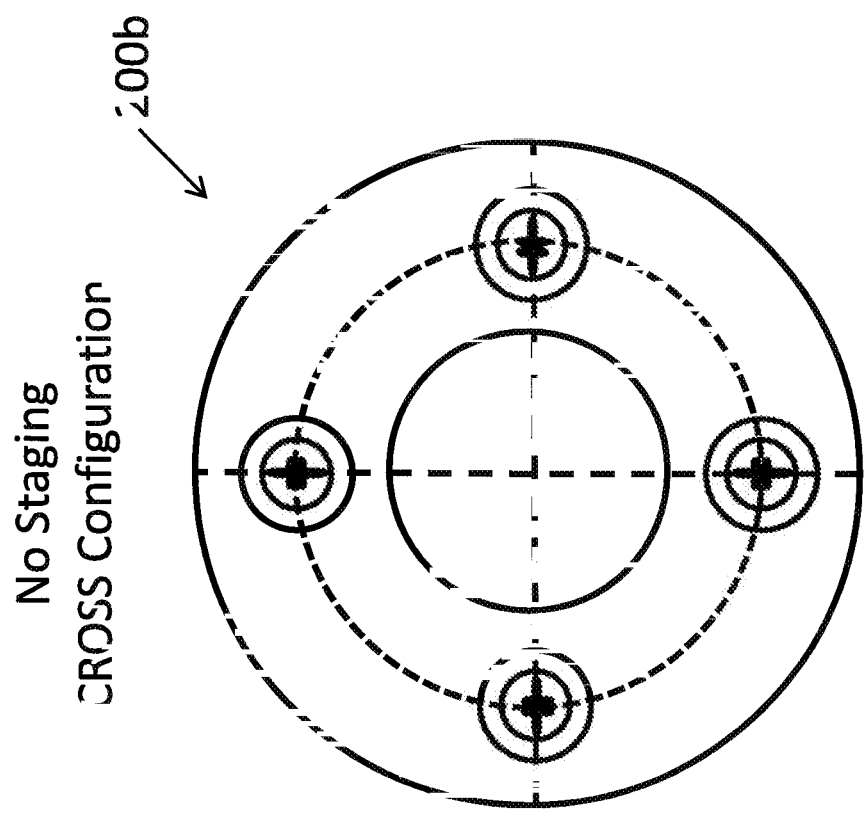
FIGS. 16A and 16B are end views comparing embodiments of a staged oxy-fuel burner with a central air nozzle, and having high shape factor flame holders oriented in a box configuration (with a major axis of the high shape factor nozzle opening intersecting a central axis of the burner) and a cross configuration (with a major axis of the high shape factor nozzle opening perpendicular to a radius extending from a central axis of the burner).
Figure 16A:
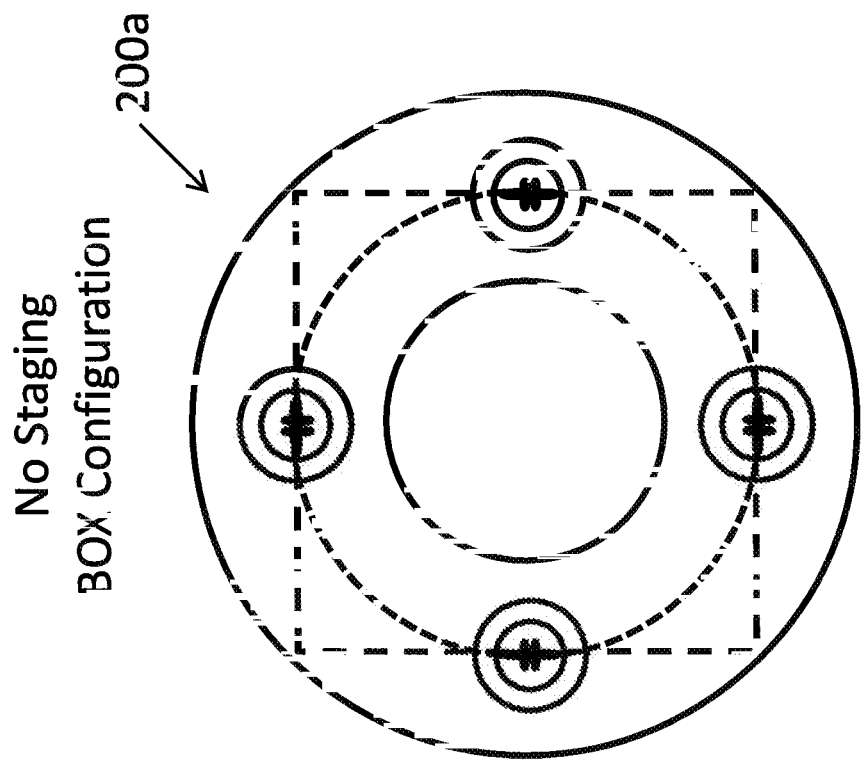

The upper curve of FIG. 20, marked by square symbols, shows higher NO production than the comparative burner across the range of oxygen enrichment. The upper curve was obtained without oxygen staging, using a burner 200a as shown in FIG. 16A with a box configuration of the flame holders 100 (i.e., a burner that would be expected to generate a heat flux profile similar to curve (B) in FIG. 19). However, a similar result would be expected with a burner 200b as shown in FIG. 16B with a cross configuration of the flame holders 110, as well as with either of the burners 100a and 100b in FIGS. 17A and 17B, respectively, when operated without oxygen staging.

The lower curve of FIG. 20, marked by plus symbols, shows lower NO production than the comparative burner across the range of oxygen enrichment. The lower curve was obtained with oxygen staging at a level of about 75% (i.e., 75% of the stoichiometric oxygen provided by oxidant in the central staging nozzle), using a burner 100b as shown in FIG. 17B with a cross configuration of the flame holders 110, the same configuration that generated the uniform heat release curve (D) in FIG. 19. Thus, a burner 100b configured and operated in this manner produces both a substantially uniform heat flux profile and decreased NOx. Further testing to compare the burner 100a (box configuration) with the burner 100b (cross configuration), under the same staging conditions, indicates that the cross configuration is better at decreasing NOx in the flue gas, although the box configuration still performs better than the comparative burner depicted in FIG. 20. Without being bound by theory, it is likely that the box configuration forms a blanket or sheet of flame around the air flow, thus providing a larger surface area for fuel/air interaction at temperatures that drive NOx formation, while the cross configuration causes the flame to penetrate into and expand away from the air flow, decreasing the surface area available for fuel/air interaction at temperatures that drive NOx formation.

Oxygen staging can be provided by oxidant (i.e., enriched air or nearly pure oxygen) in the central staging nozzle 152, by oxidant (i.e., air, enriched air, or nearly pure oxygen) in the annular air nozzle, or by a combination thereof, in any proportion. During testing, lower NOx production and more uniform heat flux profiles were observed when staging oxygen was provided at relatively high velocity through the central staging nozzle 152 (i.e., at similar velocities to the fuel gas and oxidizer gas exiting the flame holders 110, as describe above with reference to the rapid energy release burner 10). Without being bound by theory, it is believed that the separation between the flame holders 110 and the central staging nozzle 152 allows for greater entrainment of furnace gases, which delays mixing, thereby creating a more spacious flame and decreasing the peak flame temperature. Nevertheless, more uniform heat flux profiles and decreased NOx production than in existing oxy-fuel and air-oxy-fuel burners can also be achieved when some or all of the staging oxygen is provided by air, and when staging oxygen is provided by oxidant at lower momentums.

The staged burner 100, or its variants 100a, 100b, 200a, 200b, can be operated at near air-fuel conditions, if desired, due to the stability of the flame generated by the flame holders 110 under extremely substoichiometric conditions. Testing has shown that the flame holder 110 can hold a stable flame with only about 5% of stoichiometric oxygen. In other words, when fuel gas (e.g., natural gas) is supplied through the HSF nozzle opening 138 and oxidant (e.g., oxygen) is supplied through the annular nozzle opening 128 at about 5% of the stoichiometric requirement, a stable flame is held on the face of the flame holder 110 which can provide an ignition source to combust the remainder of the fuel with air supplied via the air nozzle 158. Thus, the burner can be operated in this mode even in a cold furnace that is well below the auto-ignition temperature. To facilitate combustion when the burner is operated in this mode, it is preferred to have the flame holders 110 angled radially inward at an angle β of at least about 3°, and as large as about 10°.

Alternatively, if operating the burner in a furnace that is above the auto-ignition temperature, the burner can be operated in an air-fuel mode with no oxygen enrichment by supplying fuel gas via the HSF nozzles and air via the air nozzle 158.

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. A staged burner comprising:
a central staging oxidant nozzle defining a central axis of the staged burner;
a plurality of flame holders each having an axis spaced apart from the central axis of the burner; and
an annular air nozzle concentrically surrounding the central oxidant staging nozzle and positioned radially inward from the flame holders;
wherein each flame holder comprises:
a high shape factor nozzle including a nozzle discharge opening having a shape factor from about 10 to about 75, the shape factor being defined as the square of the nozzle perimeter divided by twice the nozzle cross-sectional area; and
an annular nozzle surrounding the high shape factor nozzle;
wherein the high shape factor nozzle is configured to be supplied with one of a fuel gas and an oxidizer gas, and the annular nozzle is configured to be supplied with the other of a fuel gas and an oxidizer gas.

2. The staged burner of claim 1, wherein the high shape factor nozzle opening includes a major axis of the nozzle opening.

3. The staged burner of claim 2, wherein the high shape factor nozzle opening includes a central slot having a lengthwise direction defining the major axis and one or more cross-slots intersecting the central slot.

4. The staged burner of claim 2, wherein at least one flame holder is oriented so that the major axis of the high shape factor nozzle opening intersects the central axis of the staged burner.

5. The staged burner of claim 4, wherein each flame holder is oriented so that the major axis of the high shape factor nozzle opening intersects the central axis of the staged burner.

6. The staged burner of claim 2, wherein at least one flame holder is oriented so that the major axis of the high shape factor nozzle opening is perpendicular to a radius extending outward from the central axis of the staged burner.

7. The staged burner of claim 6, wherein each flame holder is oriented so that the major axis of the high shape factor nozzle opening is perpendicular to a radius extending outward from the central axis of the staged burner.

8. The staged burner of claim 2, wherein a plane extending generally axially outward from the major axis of the high shape factor nozzle opening of each the flame holder is substantially parallel to the central burner axis.

9. The staged burner of claim 3, wherein a center plane of the central slot is angled with respect to an inlet flow axis of the high shape factor nozzle at an angle of about 30° radially inward to about 30° radially outward.

10. The staged burner of claim 3, wherein a center plane of the central slot is angled with respect to an inlet flow axis of the high shape factor nozzle radially inward toward the inlet flow axis at an angle of less than or equal to about 10°.

11. The staged burner of claim 2,
wherein the high shape factor nozzle has a body that tapers narrower toward the nozzle opening, the nozzle body having two tapered faces that at an angle of about 15° to about 30° with respect to a center plane of the high shape factor nozzle opening; and
wherein the high shape factor nozzle has a cross-sectional area, and wherein an outlet face of the high shape factor nozzle has an area from about 35% to about 70% of the high shape factor nozzle cross-sectional area.

12. The staged burner of claim 1, wherein the high shape factor nozzle is configured to be supplied with fuel gas and the annular nozzle is configured to be supplied with oxidizer gas.

13. The staged burner of claim 1, wherein the high shape factor nozzle is configured to be supplied with oxidizer gas and the annular nozzle is configured to be supplied with fuel gas.

14. The staged burner of claim 1, wherein the flame holders are approximately equally spaced apart with respect to each other.

15. The staged burner of claim 1, wherein the annular nozzle has a discharge end, and wherein the nozzle opening of the high shape factor nozzle is axially recessed from the discharge end by less than or equal to about one high shape factor nozzle diameter.

16. The staged burner of claim 1,
wherein an annular nozzle opening is formed between the annular nozzle and the high shape factor nozzle; and
wherein the high shape factor nozzle opening and the annular nozzle opening are sized so as to provide a velocity ratio of a gas stream flowing through the annular nozzle to a gas stream flowing through the high shape factor nozzle opening, $V_{ANNULAR}/V_{HSF}$, of less than about 1.

17. A method of combustion using a staged burner as in claim 1, the method comprising:
supplying oxidizer gas to the central oxidant staging nozzle;
supplying fuel gas and oxidizer gas to the plurality of flame holders each having an axis spaced apart from a central axis of the burner, each flame holder having a high shape factor nozzle and an annular nozzle surrounding the high shape factor nozzle;
flowing one of the fuel gas and the oxidizer gas through the high shape factor nozzle; and
flowing the other of the fuel gas and the oxidizer gas through the annular nozzle.

18. The method of claim 17, wherein fuel gas is flowed through the high shape factor nozzle and oxidizer gas is flowed through the annular nozzle.

19. The method of claim 17, wherein oxidizer gas is flowed through the high shape factor nozzle and fuel gas is flowed through the annular nozzle.

20. The method of claim 17, wherein the central oxidant nozzle includes a central staging nozzle and an annular nozzle surrounding the central staging nozzle and positioned radially inward from the flame holders, further comprising:
flowing oxidizer gas through the central staging nozzle; and
flowing air through the annular nozzle.

21. The method of claim 17, further comprising flowing oxidizer gas through the central oxidant nozzle.

22. The method of claim 17, further comprising flowing air through the central oxidant nozzle.

23. The method of claim 17, further comprising:
flowing sufficient flow of the oxidizer gas to the central oxidant nozzle to provide about 75% of the stoichiometric oxygen requirement for the fuel gas; and
flowing sufficient flow of the oxidizer gas to the flame holders to provide the balance of the stoichiometric oxygen requirement for the fuel gas.

24. The method of claim 17, further comprising:
flowing sufficient flow of the oxidizer gas to the central oxidant nozzle to provide from about 50% to about 90% of the stoichiometric oxygen requirement for the fuel gas; and
flowing sufficient flow of the oxidizer gas to the flame holders to provide the balance of the stoichiometric oxygen requirement for the fuel gas.

25. The method of claim 17, further comprising:
flowing sufficient flow of the oxidizer gas to the flame holders to provide essentially 100% of the stoichiometric oxygen requirement for the fuel gas; and
flowing essentially 0% of the stoichiometric requirement of oxidizer gas to the central oxidant nozzle.

26. The method of claim 17, further comprising:
flowing sufficient flow of the oxidizer gas to the flame holders to provide no more than about 5% of the stoichiometric oxygen requirement for the fuel gas; and
flowing sufficient flow of the oxidizer gas to the central oxidant nozzle to provide the balance of the stoichiometric oxygen requirement for the fuel gas.

27. The method of claim 17, further comprising:
flowing sufficient flow of the oxidizer gas to the central oxidant nozzle to provide essentially 100% of the stoichiometric oxygen requirement for the fuel gas; and
flowing essentially 0% of the stoichiometric requirement of oxidizer gas to the flame holders.

28. The method of claim 17, wherein the high shape factor nozzle opening of each flame holder includes a major axis and wherein a plane extending generally axially outward from the major axis of each flame holder flame holder axis is angled radially inward toward the central burner axis at an angle of less than or equal to about 10°.

29. The method of claim 17, wherein the flame holders are approximately equally spaced apart with respect to each other.

30. The method of claim 17,
wherein the high shape factor nozzle opening includes a major axis of the nozzle opening; and
wherein each flame holder is oriented so that the major axis of the high shape factor nozzle opening intersects the central axis of the burner.

31. The method of claim 17,
wherein the high shape factor nozzle opening includes a major axis of the nozzle opening; and wherein each flame holder is oriented so that the major axis of the high shape factor nozzle opening is perpendicular to a radius extending outward from the central axis of the burner.

32. The method of claim 17, wherein an annular nozzle opening is formed between the annular nozzle and the high shape factor nozzle, further comprising:
   causing the ratio of the velocity of the gas flowing through the annular nozzle opening to the velocity of the gas flowing through the high shape factor nozzle opening, $V_{ANNULAR}/V_{HSF}$, to be less than about 1.

* * * * *